(12) United States Patent
Church et al.

(10) Patent No.: US 11,332,228 B2
(45) Date of Patent: May 17, 2022

(54) AIRCRAFT FUSELAGE WITH COMPOSITE PRE-FORM

(71) Applicant: Aurora Flight Sciences Corporation, Manassas, VA (US)

(72) Inventors: Clint Church, Manassas, VA (US); Jeffrey Chambers, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 893 days.

(21) Appl. No.: 15/946,879

(22) Filed: Apr. 6, 2018

(65) Prior Publication Data

US 2019/0308715 A1 Oct. 10, 2019

(51) Int. Cl.
*B64C 1/06* (2006.01)
*B64C 1/12* (2006.01)
*B64C 1/00* (2006.01)

(52) U.S. Cl.
CPC .............. *B64C 1/061* (2013.01); *B64C 1/00* (2013.01); *B64C 1/069* (2013.01); *B64C 1/12* (2013.01); *B64C 2001/0036* (2013.01); *B64C 2001/0045* (2013.01); *B64C 2001/0072* (2013.01)

(58) Field of Classification Search
CPC .......... B64C 1/061; B64C 1/069; B64C 1/12; B64C 2001/0036; B64C 2001/0045; B64C 2001/0072
See application file for complete search history.

(56) References Cited

U.S. PATENT DOCUMENTS

| | | | |
|---|---|---|---|
| 3,155,348 A | 11/1964 | Ricard | |
| 3,405,893 A * | 10/1968 | Rajau | ...................... B64C 39/00 244/119 |
| 4,674,712 A | 6/1987 | Whitener et al. | |
| 5,086,996 A | 2/1992 | Roeder et al. | |
| 6,520,706 B1 | 2/2003 | McKague, Jr. et al. | |
| 6,527,894 B1 | 3/2003 | Rocker et al. | |
| 6,553,734 B1 | 4/2003 | McKague, Jr. et al. | |

(Continued)

FOREIGN PATENT DOCUMENTS

| | | |
|---|---|---|
| CA | 2714602 | 8/2009 |
| WO | 02/066235 A1 | 8/2002 |

OTHER PUBLICATIONS

Department of Defense Handbook: Composite Materials Handbook, vol. 5. Ceramic Matrix Composites, Jun. 17, 2002.

(Continued)

*Primary Examiner* — Philip J Bonzell
(74) *Attorney, Agent, or Firm* — Michael Stanley Tomsa; McAndrews, Held & Malloy, Ltd.; Eugene H. Nahm

(57) ABSTRACT

A wide-body aircraft is disclosed with a fuselage section that includes a set of side-by-side fuselage lobes having a fuselage skin. A first woven composite preform positioned at a first intersection of the set of side-by-side fuselage lobes located at a first cusp of the side-by-side fuselage lobes. A second woven composite preform positioned at a second intersection of the set of side-by-side fuselage lobes located at a second cusp of the side-by-side fuselage lobes. Each of the first and second woven composite preforms are configured to receive a structural component, such that each of the first and second woven composite preforms accommodates vertical load imparted through the structural component.

15 Claims, 14 Drawing Sheets

(56) References Cited

U.S. PATENT DOCUMENTS

| | | |
|---|---|---|
| 6,589,472 B1 | 7/2003 | Benson et al. |
| 6,849,150 B1 | 2/2005 | Schmidt |
| 6,874,543 B2 | 4/2005 | Schmidt et al. |
| 6,911,175 B2 | 6/2005 | Benson et al. |
| 7,087,317 B2 | 8/2006 | Ehrstrom et al. |
| 7,625,510 B2 | 12/2009 | Ashton et al. |
| 7,681,835 B2 | 3/2010 | Simpson et al. |
| 7,712,488 B2 | 5/2010 | Goering et al. |
| 7,867,566 B2 | 1/2011 | Blanton et al. |
| 8,079,387 B2 | 12/2011 | Goering et al. |
| 8,127,802 B2 | 3/2012 | Ouellette et al. |
| 8,720,825 B2 | 5/2014 | Kismarton |
| 10,040,538 B2 * | 8/2018 | Abe ................. B29C 66/12443 |
| 2003/0037867 A1 | 2/2003 | Bersuch et al. |
| 2003/0041948 A1 | 3/2003 | Bersuch et al. |
| 2003/0196741 A1 | 10/2003 | Burgess et al. |
| 2009/0247034 A1 | 10/2009 | Goering et al. |
| 2012/0148789 A1 | 6/2012 | Hallander et al. |
| 2013/0216770 A1 | 8/2013 | Gilbertson et al. |

OTHER PUBLICATIONS

Fiberglass 101—The Basics retrieved from <http://centralfloridafieros.com/forum/index.php?topic=149.0;wap2> on Nov. 25, 2012.

Umeco: Bloodhound SSC Product Sponsor, ACG Bloodhound SSC Flier A 1, Sep. 2011.

Chambers, Jeffrey T., AIAA SciTech Paper: "Structural Optimization Study of the D8 Double-Bubble Composite Fuselage" Dec. 13, 2016.

The extended European search report for EU Application No. 19167698.0, dated Aug. 16, 2019.

The Communication for EU Application No. 19167698.0, dated Aug. 9, 2021 (4 pages) European Patent Office, Germany.

\* cited by examiner

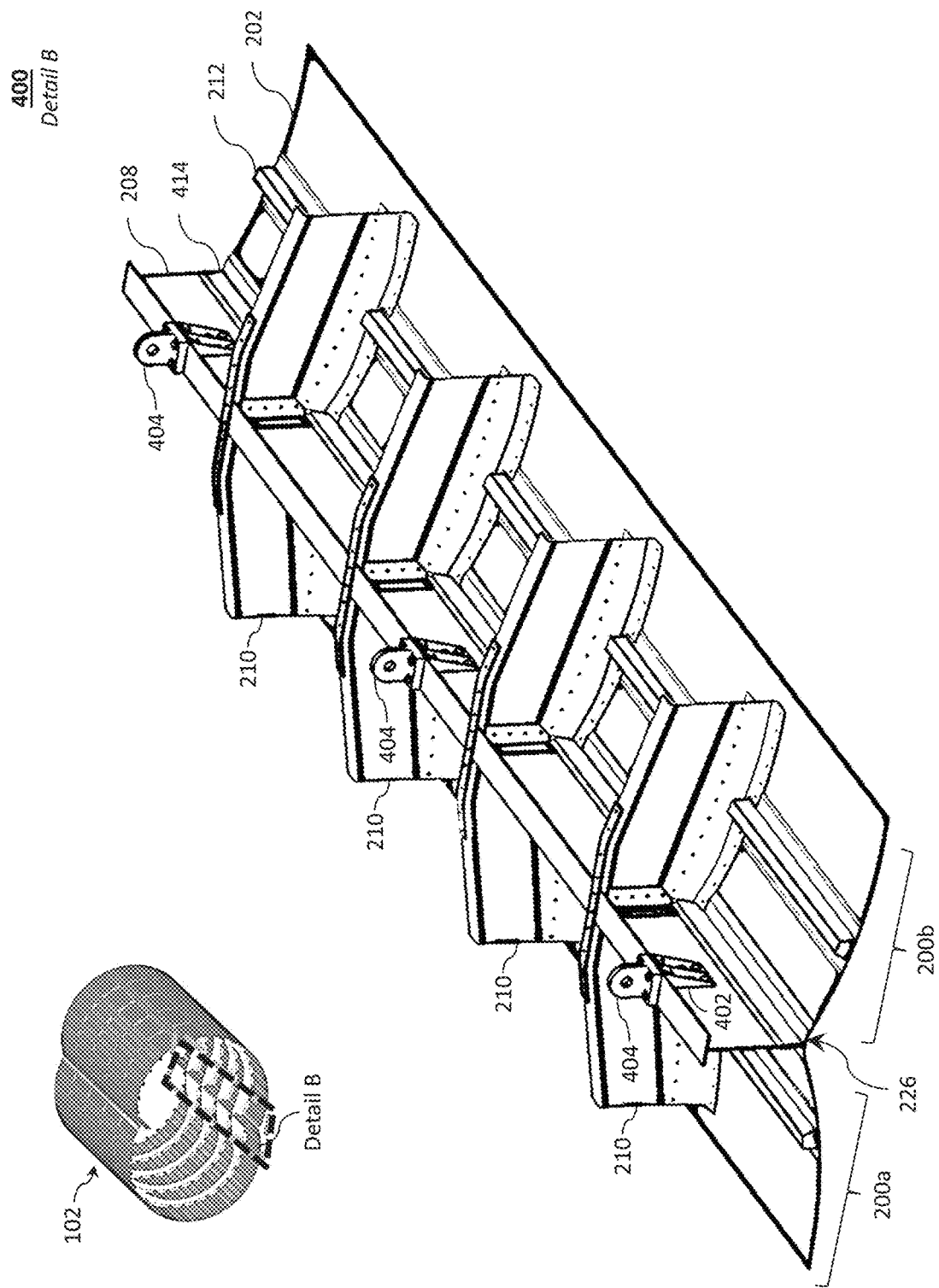

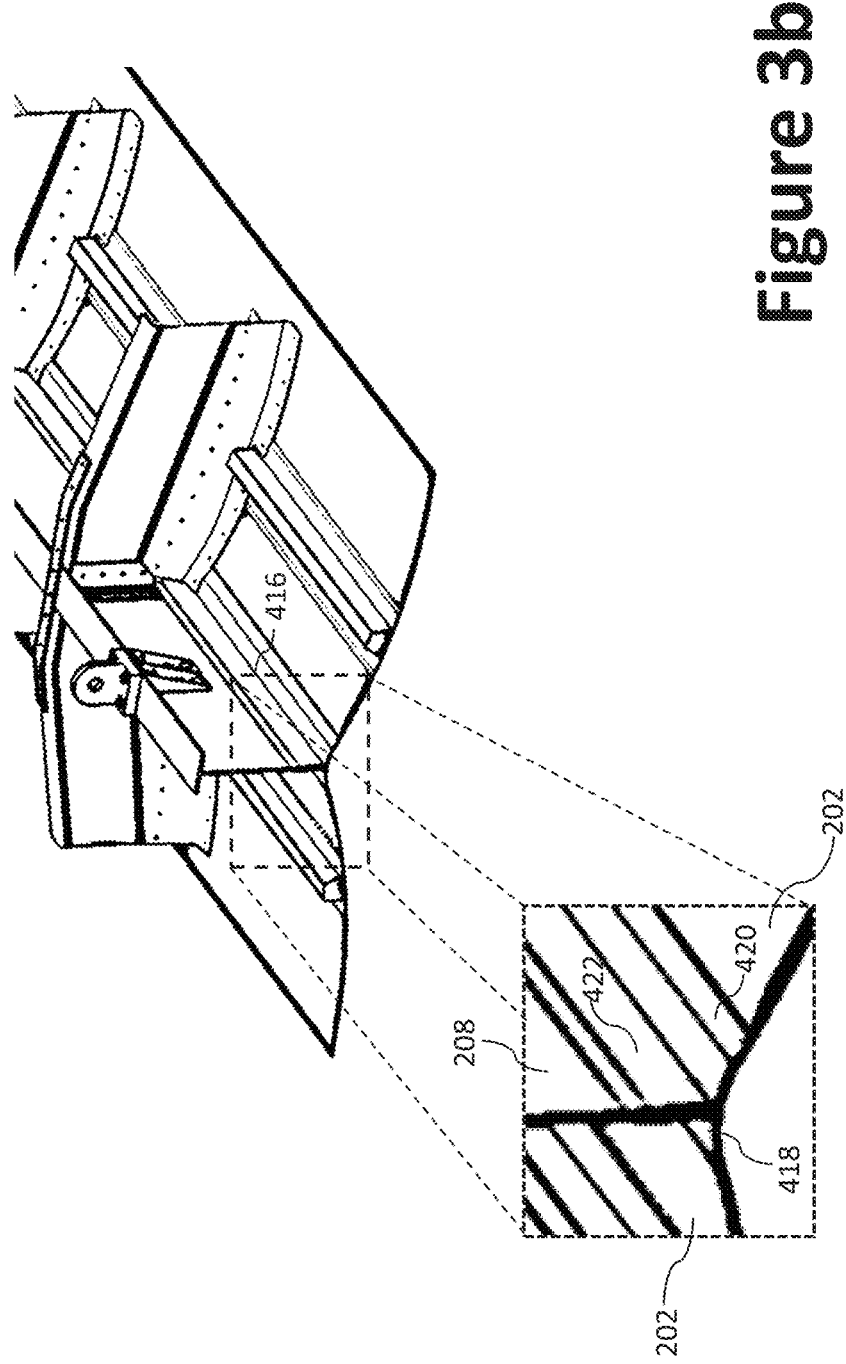

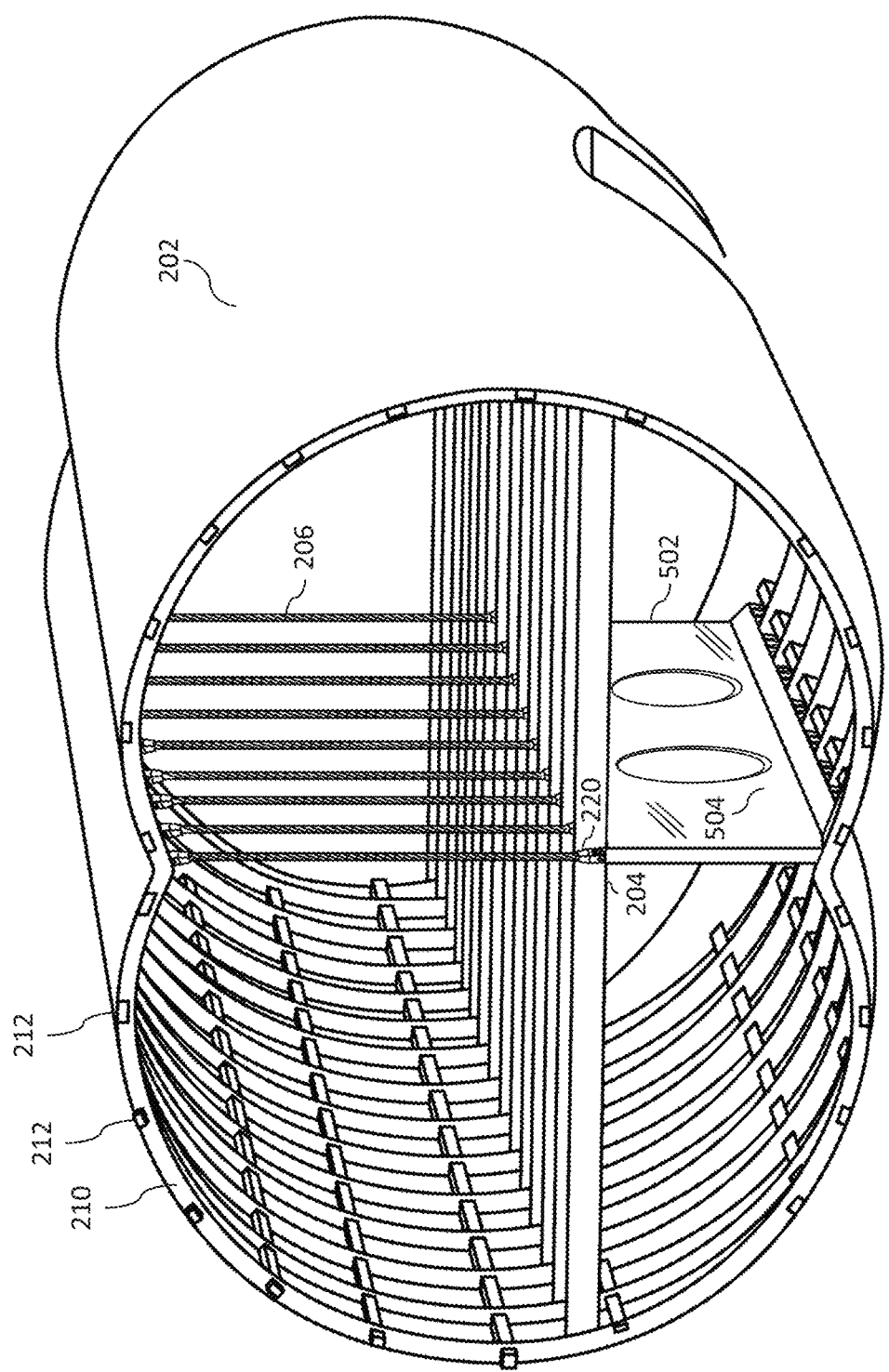

AIRCRAFT FUSELAGE WITH COMPOSITE PRE-FORM

STATEMENT OF GOVERNMENT INTEREST

This invention was made with government support under Contract Number NND15AC56C awarded by the National Aeronautics and Space Administration (NASA) and Contract Number DTFAWA-15-A-80014 awarded by the Federal Aviation Administration (FAA). The government has certain rights in the invention.

TECHNICAL FIELD

The present disclosure relates to an advanced fuel-efficient aircraft, more specifically to airframes for advanced fuel-efficient aircraft, and even more specifically, to fuselages and wide-body fuselages with improved structural support elements, such as 3-dimensional woven composite preform supports to distribute forces from within the fuselage, and methods for employing such support elements.

BACKGROUND

There is a strong economic desire to improve the fuel efficiency of commercial aircraft. The basic aircraft platform, however, has not substantially changed since the dawn of the commercial jet age. The dominant commercial aircraft configuration—a tube-and-wing configuration—is a highly optimized and mature platform from which it is becoming increasingly difficult to extract further fuel efficiency improvements. Therefore, alternative commercial aircraft configurations have been explored.

Instead of a traditional tube-and-wing configuration, other aircraft configurations may be employed to increase efficiency, such as a wide-body fuselage. A wide-body fuselage offers certain advantages over a tubular fuselage. For example, increased lift generated by the wide-body fuselage means that smaller wings may be used to carry the weight of the aircraft, thereby resulting in less fuel needed to fly a given flight plan. Moreover, a wide-body fuselage allows for integration of propulsors at the back (aft) end of the fuselage, which can ingest the boundary layer traveling over the wide-body fuselage using a technique known as boundary layer ingestion (BLI). BLI further reduces the thrust requirements of the wide-body aircraft, which means that smaller propulsors can be used to reduce both weight and fuel consumption.

While a wide-body fuselage offers numerous efficiency improvements, the wide-body fuselage introduces structural complexities compared to tubular and elliptical fuselage designs. In an elliptical fuselage, inflections typically occur at the boundary between the passenger cabin and baggage compartment, in which case the floor beams react to this expansion load internally. In the case of a wide-body fuselage, inflections can occur at the top and bottom of the wide-body fuselage, where the aircraft outer mold line is generally flat (or planar) compared to the remainder of the fuselage. Therefore, in a wide-body fuselage, structural elements should be specifically tailored to counter these inflections. In view of the foregoing, a need exists for a novel wide-body fuselage with improved structural support elements that overcome the deficiencies in the prior art.

SUMMARY

The present disclosure is directed to an advanced fuel-efficient aircraft, more specifically to airframes for advanced fuel-efficient aircraft, and even more specifically, to fuselages and wide-body fuselages with improved structural support members, such as 3-dimensional woven composite preform supports, to serve as distribution members for forces resulting from internal pressures acting on vertical tension members during flight, and methods for employing such support elements.

According to a first aspect, a fuselage comprises: a wide-body fuselage section comprising a set of side-by-side fuselage lobes having a fuselage skin; a first woven composite preform positioned at a first intersection of the set of side-by-side fuselage lobes and located at a first cusp of the set of side-by-side fuselage lobes; and a second woven composite preform positioned at a second intersection of the set of side-by-side fuselage lobes and located at a second cusp of the set of side-by-side fuselage lobes, wherein each of the first and second woven composite preforms are configured to receive a structural component, such that each of the first and second woven composite preforms accommodates a vertical load imparted through the structural component.

In certain aspects, the first and second woven composite preforms are co-cured with the fuselage skin of the set of side-by-side fuselage lobes to maintain a desired shape.

In certain aspects, a joint at each of the first and second cusps between the set of side-by-side fuselage lobes is substantially Y-shaped.

In certain aspects, each of the first and second woven composite preforms are impregnated with a resin to be co-cured with the set of side-by-side fuselage lobes at a joint.

In certain aspects, each of the first and second woven composite preforms comprises a non-planar base with one or more legs extending from the base, the base configured to conform to an arced contour of the wide-body fuselage and the legs securing the structural component.

In certain aspects, each of the first and second woven composite preforms comprises a plurality of strands that are woven together to form a structural distribution member for the set of fuselage lobes and the structural component.

In certain aspects, the plurality of strands comprises at least one of carbon fiber, steel, or aluminum.

In certain aspects, the plurality of strands is arranged to define a plurality of strand bundles.

In certain aspects, the plurality of strands is twisted or braided to define the plurality of strand bundles.

In certain aspects, the set of side-by-side fuselage lobes are arranged to define a non-circular cross-section along a lateral length of the wide-body fuselage section.

In certain aspects, the fuselage further comprises a vertical tension member secured between the structural component received by each of the first and second woven composite preforms, the first and second woven composite preforms configured to distribute tensile or compressive loads from the vertical tension member.

In certain aspects, the first and second woven composite preforms become rigid once co-cured.

In certain aspects, each of the first and second woven composite preforms is configured to transfers at least a portion of a pressure load between the fuselage skin and one or both of the first and second woven composite preforms.

According to a second aspect, a woven composite preform configured to manage tension in a wide-body fuselage comprises: a non-planar base with one or more legs extending from the base, the base configured to conform to an arced contour of the wide-body fuselage and the legs configured to secure a structural component; and a plurality of strands that are woven together to form the woven composite preform for the wide-body fuselage and the structural component, wherein the woven composite preform is configured to distribute loads imparted via the structural component.

In certain aspects, the woven composite preform is further configured to secure a vertical tension member to the wide-body fuselage section, wherein the vertical tension member is secured between a structural component located at a top cusp of the wide-body fuselage and another structural component located at a bottom cusp of the wide-body fuselage, the woven composite preform configured to distribute forces from the vertical tension member under a compression load.

In certain aspects, the woven composite preform and one or more lobes of the wide-body fuselage are impregnated with a resin to co-cure the lobes and the woven composite preform together in substantially a Y-shape at the joint.

In certain aspects, the plurality of strands of the woven composite preform comprises at least one of carbon fiber, steel, or aluminum.

According to a third aspect, a method for managing loads imparted within a wide-body fuselage comprises the steps of: providing the wide-body fuselage comprising a set of side-by-side fuselage lobes; joining the set of side-by-side fuselage lobes together, forming intersections at a top and a bottom of the resulting wide-body fuselage; placing a woven composite preform at each of the intersections; bonding the woven composite preform to the wide-body fuselage at the intersections; inserting a keel within the woven composite preform; and forming a skin over the wide-body fuselage.

In certain aspects, the method further comprises the step of forming a bond between a cusp of the fuselage skin and the woven composite preform by applying a resin or adhesive at the intersections.

In certain aspects, the method further comprises the step of fastening the woven composite preform to a keel of the wide-body fuselage.

DESCRIPTION OF THE DRAWINGS

These and other advantages of the present invention may be readily understood with reference to the following specifications and attached drawings wherein:

FIG. 1b illustrates a top plan view of the aircraft of FIG. 1a.

FIG. 1c illustrates a side view of the aircraft of FIG. 1a.

FIG. 1d illustrates a rear view of the aircraft of FIG. 1a.

FIGS. 1e through 1g illustrate, respectively, top plan, side, and rear views of the aft end of the aircraft of FIG. 1a.

FIG. 3a illustrates an enlarged view of the wide-body fuselage at its Y-Joint, from Detail B.

FIG. 3b illustrates a detailed view of a 3-dimensional woven composite preform from the enlarged view of the wide-body fuselage at its Y-Joint, from Detail B.

FIG. 5a illustrates a perspective cross-sectional view taken along cross-section B-B of FIG. 1c having a hybrid of a cable bundle and a keel.

DETAILED DESCRIPTION

Figure 1A:
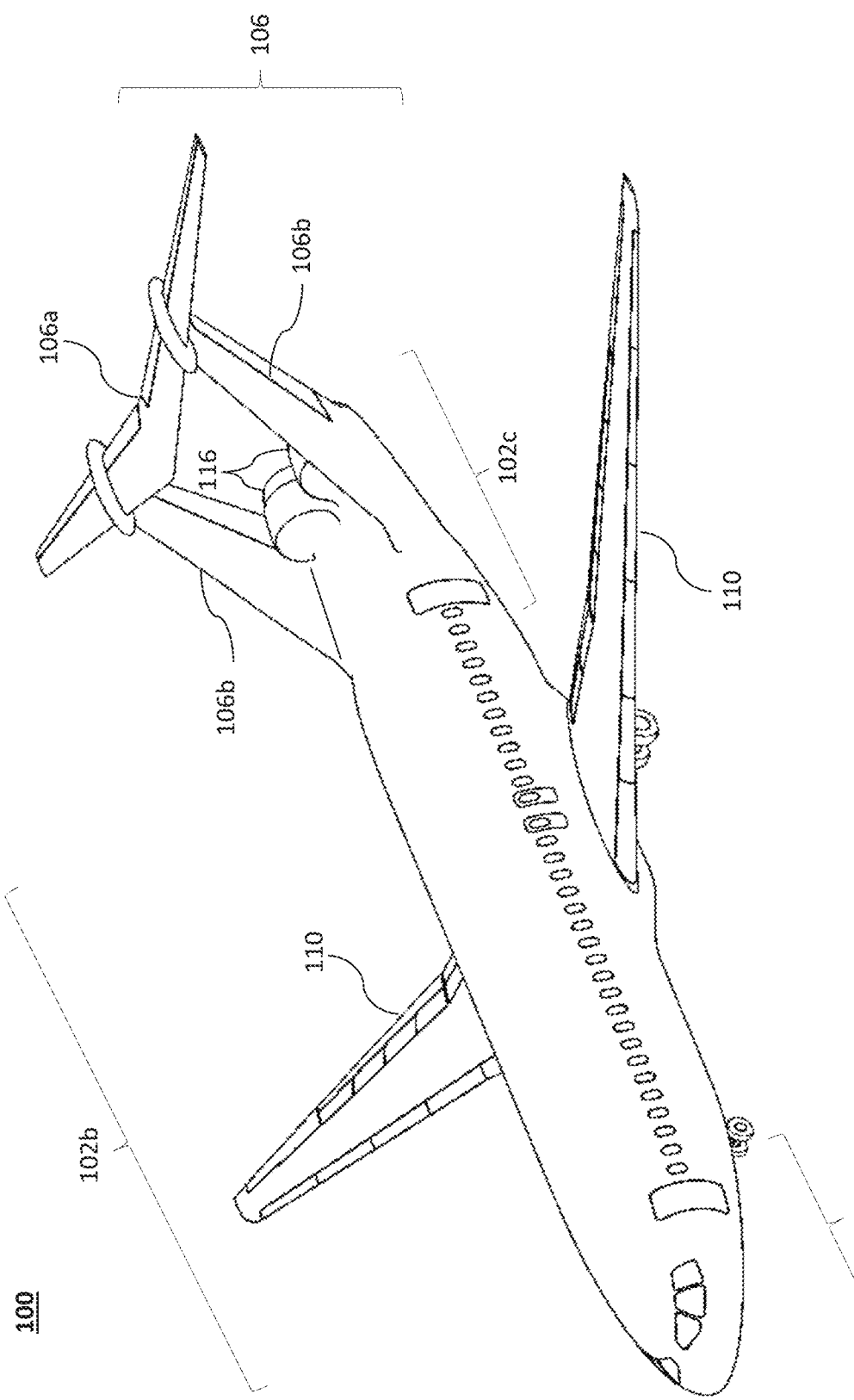
FIG. 1a illustrates an isometric view of an example aircraft in accordance with an aspect of the present disclosure.

Preferred embodiments of the present disclosure may be described hereinbelow with reference to the accompanying drawings. In the following description, well-known functions or constructions are not described in detail because they may obscure the disclosure in unnecessary detail.

In the following description, it is understood that terms such as "first," "second," "top," "bottom," "side," "front," "back," and the like are words of convenience and are not to be construed as limiting terms. Further, the use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. For this disclosure, the following terms and definitions shall apply.

The terms "aerial vehicle" and "aircraft" refer to a machine capable of flight, including, but not limited to, traditional aircraft and aircraft configured for vertical takeoff and landing (VTOL).

The terms "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments.

The term "and/or" means any one or more of the items in the list joined by "and/or." As an example, "x and/or y" means any element of the three-element set {(x), (y), (x, y) }. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The term "composite material" refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material.

The term "composite structure" as used herein, refers to structures or components fabricated, at least in part, using a composite material, including, without limitation, composite laminates, woven fibers, etc.

The present disclosure is directed to an advanced fuel-efficient aircraft, more specifically to airframes for advanced fuel-efficient aircraft, and even more specifically, to fuselages and wide-body fuselages with improved structural support elements. In one aspect, the wide-body fuselage may employ efficient structural distribution members configured to react to pressure loads in a wide-body aircraft fuselage. For example, a plurality of cable bundles serve as vertical tension members between longitudinal structural components at an interface between lobes of the fuselage. The vertical tension members are structurally in connection with a distribution member, such as a 3-dimensional woven composite preform, to distribute forces from the vertical tension members within the fuselage. The disclosure further describes the attachment geometry thereof and possible incorporation into the wide-body fuselage structure.

Disclosed herein are systems and methods of a 3-dimensional woven composite preform made of a composite material, used as a structural distribution member at the joint between the dual-lobes of a wide-body aircraft fuselage to distribute forces from within the fuselage. The preform has a base with one or more structural supporting members extending therefrom, resulting in a generally "Y" shaped member. The shape of the preform is specifically tailored for placement at the cusps formed at the joints of a dual-lobe, wide bodied aircraft, such as aircraft 100 of FIGS. 1a through 1g.

The described modified Y-shaped woven composite preform disclosed in the present application is made by weaving composite fibers to desired dimensions, and impregnating the woven composite preform with a resin system, for example. The disclosure further describes the attachment geometry and possible incorporation into the fuselage structure. Thus, the preform is used as a structural distribution member that is specifically configured to mitigate stress from pressure loads experienced in a cabin of a multi-lobe, wide-body aircraft fuselage, at the joints where the lobes interface.

For example, the woven composite preform is constructed using fibers and shaped for the specific geometrical contours of a dual-lobe, wide body aircraft fuselage at the joint. As such, the preform is tailored to mitigate the unique stresses experienced by the dual-lobe fuselage design. In order to strengthen the preform structural distribution member, resin is impregnated into the woven fibers, such as carbon fibers. The result is a structural distribution member in the shape of "Y", with two vertical legs extending from an arced cap. The joint transfers the cabin pressure load at the interface between the two lobes of a dual-lobe, wide-body, fuselage and their respective structural support components, such as keel beams. For example, the woven composite preform can be woven from fibers of one or more materials, which can be manipulated into a desired final shape prior to impregnation of resin, thereby avoiding distortion in the fibers when being incorporated into the aircraft structure. In some examples, the preform is co-cured with one or more aircraft structures, such as the skin, frame, etc., of the aircraft, thereby maintaining the shape at the curing stage after rigidity is achieved.

The present disclosure provides a woven composite preform, which is an improvement on existing preforms and/or reinforced composite structures previously available. Thus, the presently disclosed examples provide advantages in a variety of aircraft. For example, pressurized aerostructures, such as wide-body aircraft designs, benefit from the improvements described herein.

Figure 1B:
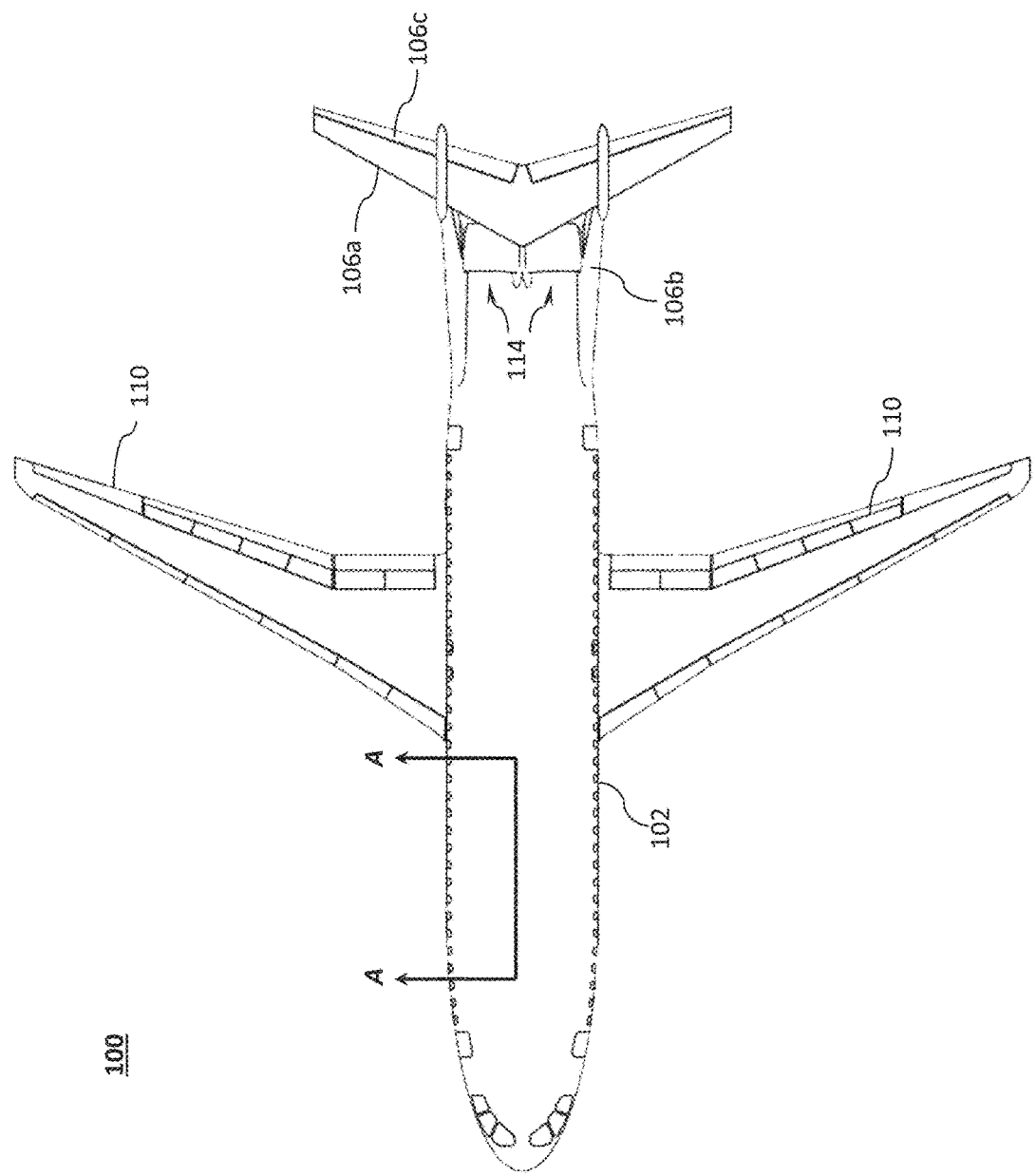
Figure 1C:
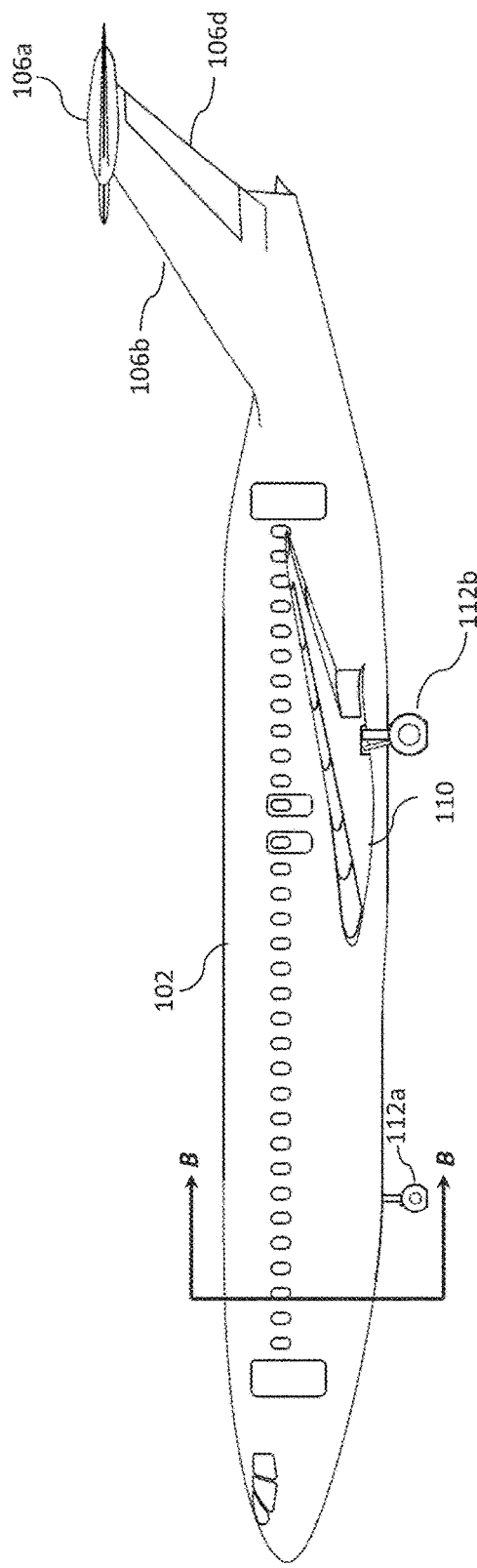
Figure 1D:
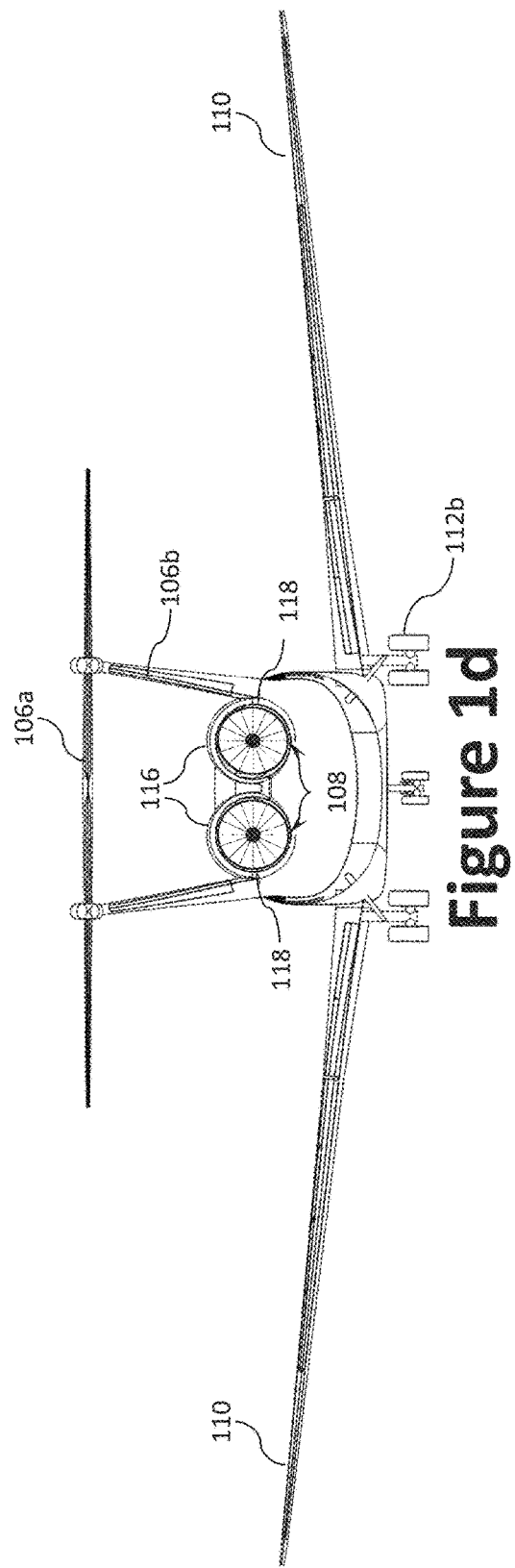
Figure 1E:
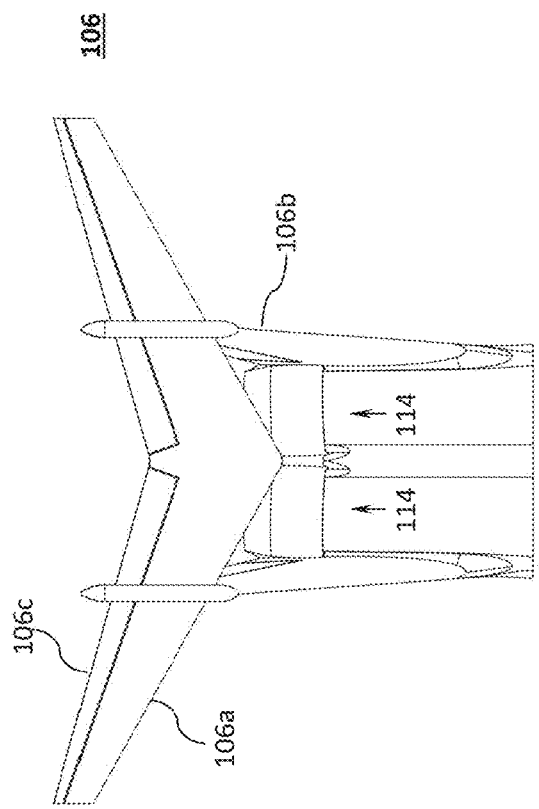
Figure 1G:
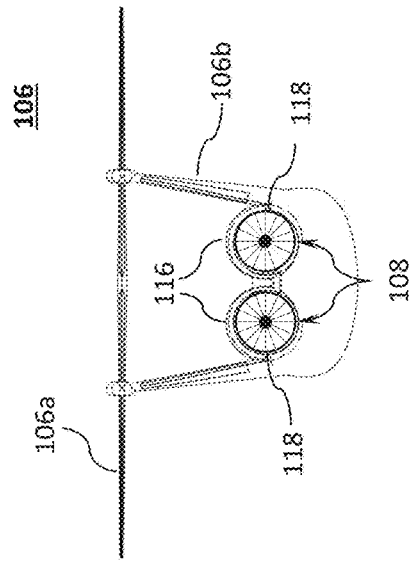
Figure 1F:
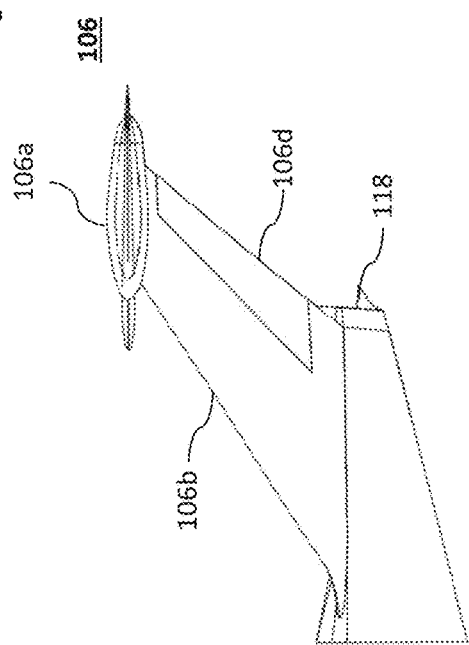

The presently described 3-dimensional woven composite preform is provided for the benefit of an example wide-body aircraft 100 according to an aspect of the present disclosure and illustrated in FIGS. 1a through 1g. Specifically, FIG. 1a illustrates an isometric view of the wide-body aircraft 100, while FIG. 1b illustrates a top plan view thereof. FIG. 1c illustrates a side view of the wide-body aircraft 100 and FIG. 1d illustrates a rear view thereof. FIGS. 1e through 1g illustrate, respectively, top, side, and rear views of the aft end of the wide-body aircraft 100 with an empennage 106. In accordance with an aspect of the present disclosure, the wide-body aircraft 100 may have a wingspan of about 70 to 270 feet, more preferably about 90 to 140 feet, most preferably about 118 feet. The length of the wide-body aircraft 100 may be about 90 to 250 feet, more preferably about 90 to 140 feet, most preferably about 115 feet. As one of skill in the art would appreciate, however, the wide-body aircraft 100 can be scaled up (or down) to facilitate a particular purpose based on, for example, mission objectives (i.e., flight objective and/or flight plan).

While the wide-body aircraft 100 is generally described herein as being manned (e.g., it contains a cockpit for a human operator), the cockpit may be omitted when the wide-body aircraft 100 is configured for unmanned and/or fully autonomous aircraft (e.g., requiring no pilot control). For example, the wide-body aircraft 100 may be controlled by an onboard autonomous autopilot or remotely controlled over a wireless communication link by a human operator, a computer operator (e.g., remote autopilot), or a base station. An unmanned variation of the wide-body aircraft 100 may be scaled down (e.g., by about 40 to 60%, or about 50%) relative to its manned counterpart as a function of mission needs (e.g., maneuverability, range, payload capacity, etc.).

As illustrated, the wide-body aircraft 100 generally comprises a wide-body fuselage 102, two wings 110, an empennage 106, and an integrated propulsion system. In operation, the integrated propulsion system generates the thrust necessary for flight. The integrated propulsion system may be positioned, at least in part, within a set of integral nacelle cowling diffusers 116. The integrated propulsion system employs one or more propulsors 118, each propulsor having one or more propulsor fans 108 to generate thrust. The one or more propulsor fans 108 may be positioned in the integral nacelle cowling diffusers 116. The diameter of the propulsor fan 108 may be, for example, about 76 inches.

The propulsors 118 may employ, for example, wet fuel engines (e.g., jet engines, jet turbines, turbofans, etc.), electric-driven (e.g., fans driven by one or more electric motors), or a hybrid thereof (e.g., where a wet fuel engine drives a generator to power an electric-driven motor coupled to the propulsor fan 108). The wide-body aircraft 100 further includes landing gear 112 (e.g., nose-end landing gear 112a and main landing gear 112b), one or more fuel tanks, an avionics bay, a payload bay, a heat exchanger (e.g., an air-cooled oil cooler with a fan), two or more forward-facing fan inlets 114 to supply air (e.g., from the boundary layer over the wide-body fuselage 102) to the propulsor fans 108, thereby facilitating boundary layer ingestion (BLI) via the integrated propulsion system.

The wide-body fuselage 102 may be segmented with one or more longitudinal structural components traversing/running longitudinally along the length (e.g., from the nose to the tail) of the fuselage 102 and positioned along the center-line of the wide-body fuselage 102. For example, the wide-body fuselage 102 may generally comprise a forward fuselage subassembly 102a, a center fuselage subassembly 102b, and an aft fuselage subassembly 102c, where the forward, center, and aft subassemblies 102a, 102b, 102c are fabricated separately and joined via the one or more longitudinal structural components. The forward fuselage subassembly 102a generally comprises the cockpit, while the center fuselage subassembly 102b generally defines the payload section (e.g., for cargo and/or passengers), as the case may be. The aft fuselage subassembly 102c defines the tail section (e.g., the empennage 106) and includes, inter alia, the integral nacelle cowling diffusers 116 to house the propulsor fans 108 or another propulsion device. The aft fuselage subassembly 102c may be integral with, or coupled to, the empennage 106.

FIGS. 1e through 1g illustrate the general arrangement of the aft fuselage subassembly 102c and empennage 106. The aft fuselage subassembly 102c may be a semi-monocoque structure with two or three major aircraft skin pieces (e.g., panels) fastened and adhered around the internal structure. A monocoque structure refers to a structure in which the chassis is integral with the body, while semi-monocoque refers to a stressed shell structure that is similar to a true monocoque, but derives at least some strength from conventional reinforcement. The empennage 106 generally comprises one or more horizontal stabilizers 106a and vertical stabilizers 106b. The empennage 106 may include redundant control surfaces with two split rudders 106d and at least two elevators 106c. The empennage 106 may be configured as one of multiple tail configurations, including, for example, fuselage mounted, a cruciform, T-tail, a flying tailplane, or, as illustrated in FIGS 1a through 1g, a pi-tail (i.e., n-tail). The three aerodynamic surfaces of the illustrated empennage 106 (i.e., the two symmetric vertical stabilizers 106b and the horizontal stabilizer 106a) may be fabricated using composite assemblies with core-stiffened skins.

The aerodynamic surfaces of the empennage 106 have primary lift spars and smaller aft spars through which they are attached to each other and the wide-body fuselage 102 in structurally determinant three point attachments with two locations on the main spar and the third on the aft spar. Example techniques for attachment of the vertical stabilizer 106b to the aft fuselage subassembly 102c include, for example: a spade-type spar extension that protrudes into the fuselage that has canted, mating offset keels; and a "knuckle"-type multi-lugged fitting arrangement located at the surface intersection of the two bodies. While a V-shaped horizontal stabilizer 106a is illustrated, other shapes are contemplated, including straight horizontal stabilizers. The symmetric vertical stabilizers 106b may attach to a tail support structure that is aligned to the tail spar angle. The symmetric vertical stabilizers 106b may be arranged as a slight V, as illustrated in FIG. 1d.

The nose landing gear 112a and main landing gear 112b systems of the wide-body aircraft 100 may employ air and/or oil type landing gear struts to absorb shock during taxiing and landing. In certain aspects, the shock absorption capability of the main landing gear 112b may be enhanced through trailing-link enhancements. For example, the main landing gear 112b may include a trailing-link suspension with one or more links connected between, and perpendicular to and forward of, the axle and a pivot point. The nose landing gear 112a steering system may employ an electro-mechanical actuator, commanded by the triplex flight computer (or other control system) of the wide-body aircraft 100, driving the hydraulically boosted nose landing gear 112a steering ram through a spool valve to obtain the required steering angle. Steering angle feedback may be produced through a rotary potentiometer. An accumulator may be used to provide adequate pressure and flow during high bandwidth operations at low engine speeds. The nose landing gear 112a may be, for example, capable of steering angles of 60-90 degrees left and right. The nose landing gear 112a and main landing gear 112b may be retracted and extended through an electrically controlled, hydraulically actuated system using the onboard hydraulic power. The brake system of the wide-body aircraft 100 may also be electrically controlled and hydraulically actuated. Control may be accomplished through, for example, the triplex flight control unit to an electromechanical actuator operating a hydraulic metering valve. Feedback may be accomplished through left and right brake system pressure sensors to the triplex flight control unit. Hydraulic pressure may be generated from the engine-driven hydraulic system and a backup braking system is accomplished through use of a pneumatic emergency pressure supply directly to the brake calipers through use of a shuttle valve.

The airframe structure of the wide-body aircraft 100, including the wide-body fuselage 102, wings 110, and empennage 106, may be fabricated using one or more metals, metal alloys, or composite structures, which can include composite laminates. For example, a plurality of metals, metal alloys, or composite structures may be assembled and joined through a co-curing process, a co-bonding process, or a mechanical attachment (e.g., using metal fittings, which may be fabricated using aluminum, titanium, lightweight alloys, etc.).

While the wide-body aircraft 100 (e.g., the wide-body fuselage 102) can be fabricated from aircraft grade metal and metal alloy, composite materials offer certain advantages over metals when fabricating structures with complex geometries. That is, a molded composite laminate may be shaped to conform with and provide a continuous structural mass to follow the contour of a complex geometry without the mass penalty or load concentrations of lapped or multiple joined metal components. With regard to the wide-body aircraft 100, as an example, the aft fuselage subassembly 102c provides a complex geometry to interface the upper surface of the center fuselage subassembly 102b with the integral nacelle cowling diffuser(s) 116, thereby directing the boundary layer from the center fuselage subassembly 102b to the forward-facing fan inlets 114 associated with the propulsor fans 108. Therefore, a composite structure may be more appropriate for the aft fuselage subassembly 102c and any other structures having a complex geometry 104.

The wide-body fuselage 102 may comprises a non-circular cross-section with a height-to-width aspect ratio that is wider (larger) than classic transports, which typically have height-to-width aspect ratios of approximately one to one (1.0:1.0) (i.e., cylindrical). The wide-body fuselage 102 may be shaped with, for example, a double-bubble fuselage, an oval fuselage, or another fuselage with a non-circular cross-section. As illustrated, unlike a traditional tube-and-wing configuration, the wide-body fuselage 102 employs a non-circular cross-section for a substantial portion of its longitudinal length.

As noted above, a wide-body fuselage 102 offers significant improvements in environmental performance and efficiency compared to a traditional tube-and-wing configuration. For example, replacing the traditional tube (i.e., having a circular cross-section) with a fuselage 102 having a non-circular wide-body: (1) increases fuselage carryover lift, which shrinks and lightens the exposed wing area; (2)

provides a nose-up trimming moment, which shrinks the horizontal tail and further shrinks the wing; (3) moves side-of-body load transfer points farther apart, giving a partial span-loading and weight reduction; (4) offers landing gear with a shorter load path into the side-of-body, resulting in lighter landing gear support structure; (5) allows for shorter landing gear struts due to its shorter tail; (6) provides fewer windows due to shorter cabin/wide-body fuselage 102, thus reducing weight; (7) reduces floor beam weight by using a floor center support, where desired; and (8) accommodates a twin-fin "pi-tail" configuration, which lightens the horizontal tail, and accommodates integral nacelle cowling diffusers 116 for rear-propulsor installation.

In certain aspects, the height-to-width aspect ratio of the wide-body fuselage 102 is greater than one (i.e., >1.0). In other aspects, the height-to-width is, for example, between 1.0:1.01 and 1.0:3.0, more preferably between about 1.0:1.1 and 1.0:2.0, even more preferably between about 1.0:1.25 and 1.0:1.75, or most preferably about 1.0:1.5. As can be appreciated, the shape of the wide-body fuselage 102 may vary along its longitudinal length. Therefore, the height-to-width aspect ratio may also vary along the longitudinal length of the wide-body fuselage 102. For example, while the center fuselage subassembly 102b may have a substantially constant shape and height-to-width aspect ratio, the height-to-width aspect ratio of the forward fuselage subassembly 102a and the aft fuselage subassembly 102c may vary. In certain aspects, the height-to-width aspect ratio of the forward fuselage subassembly 102a and the aft fuselage subassembly 102c may even approach a height-to-width aspect ratio of about one (e.g., at the nose or tail).

Figure 2A:
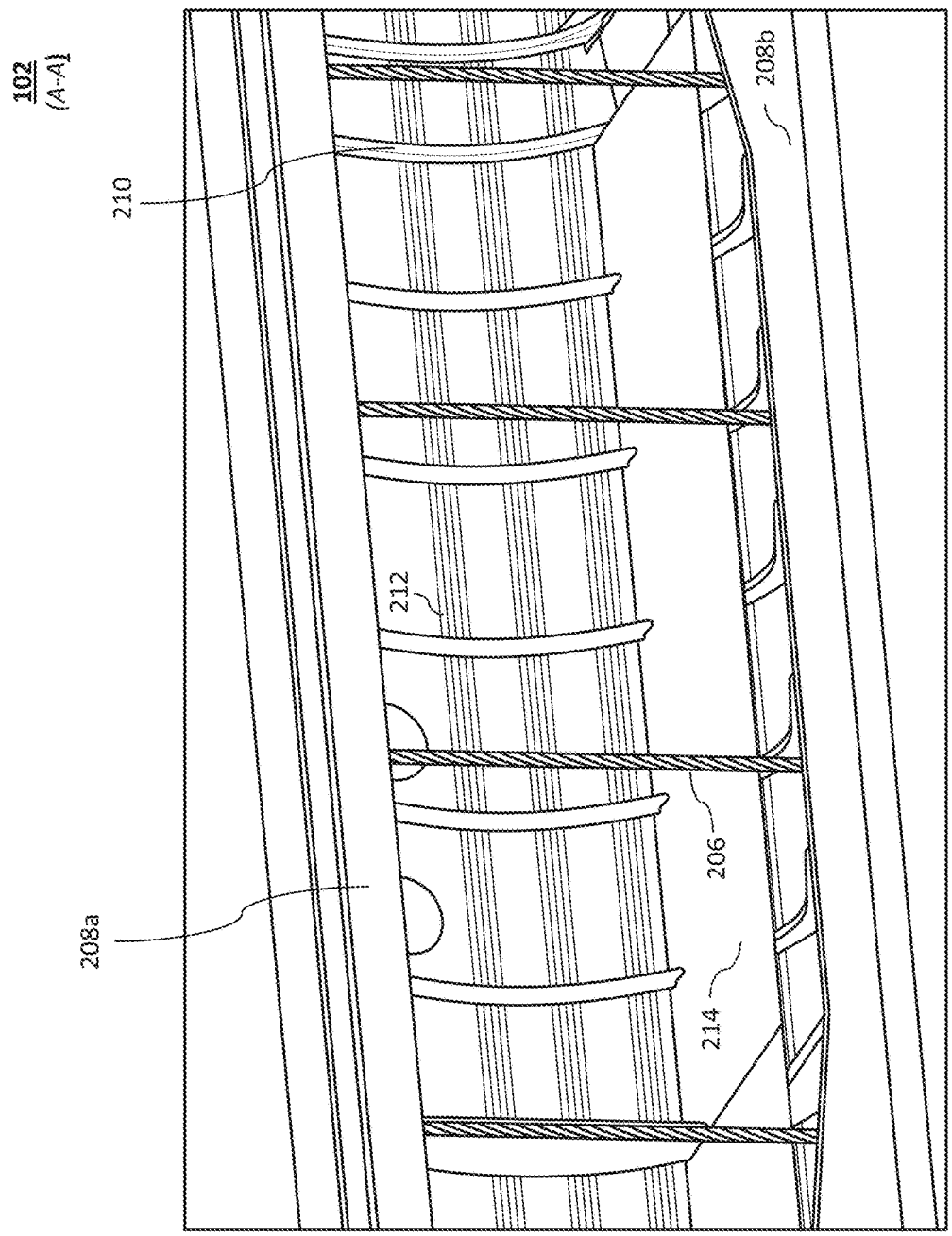
FIG. 2a illustrates a cut-away view of the wide-body fuselage taken along cross-section A-A of FIG. 1b.
Figure 2B:
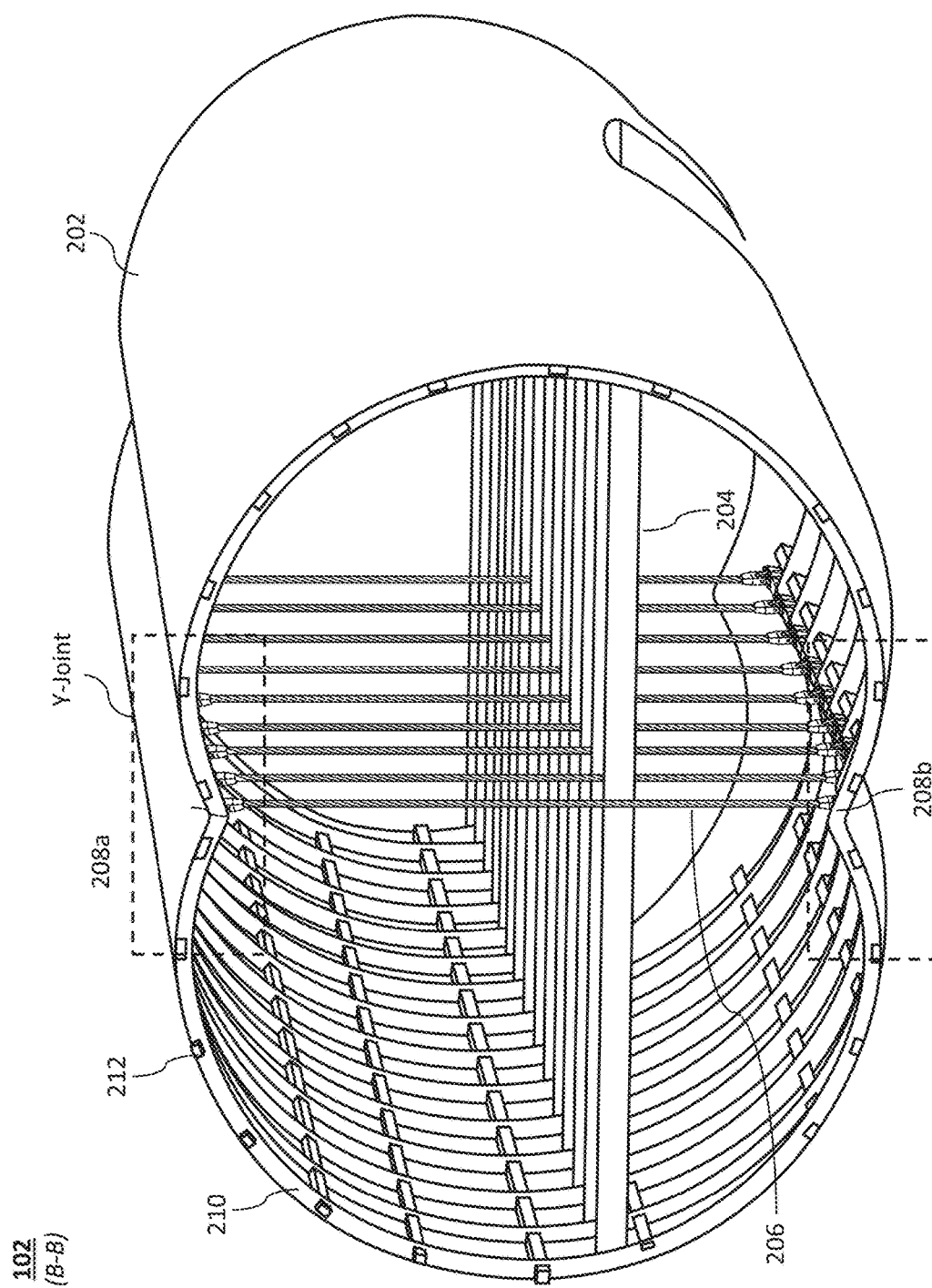
FIG. 2b illustrates a perspective cross-sectional view taken along cross-section B-B of FIG. 1c.
Figure 2C:
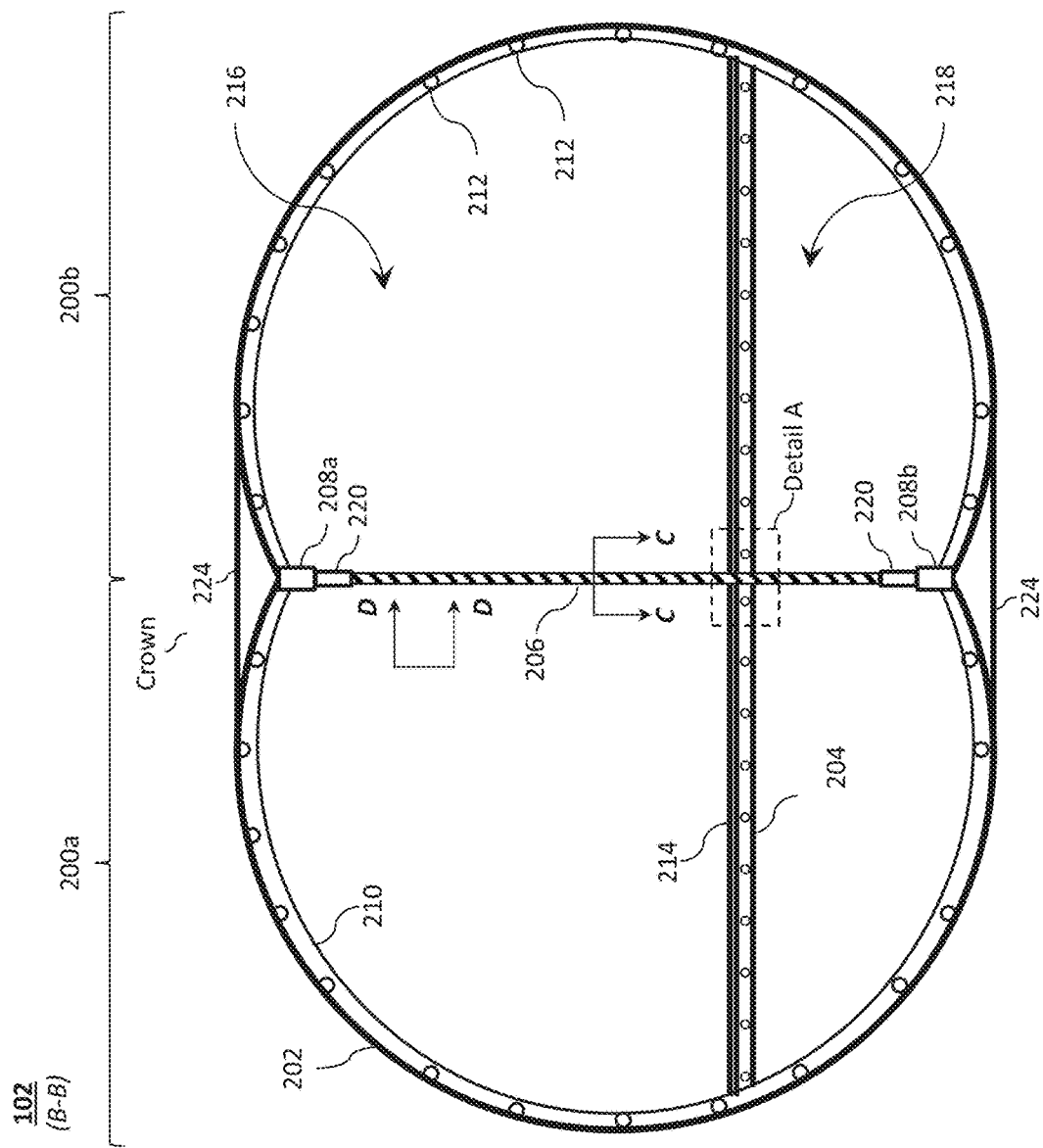
FIG. 2c illustrates a cross-sectional view of the wide-body fuselage taken along cross-section B-B of FIG. 1c.

FIGS. 2a through 2c illustrate perspective cross-sectional and cross-sectional views of a pressurized wide-body fuselage 102 with a plurality of vertical tension members (e.g., cable bundles 206) arranged to react pressure loads in the wide-body fuselage 102. More specifically, FIG. 2a illustrates a cross-sectional view of the wide-body fuselage 102 taken along the longitudinal axis (along section cut A-A of FIG. 1b), while FIGS. 2b and 2c illustrate cross-sectional views taken along the lateral axis (along section cut B-B of FIG. 1c). As illustrated, the wide-body fuselage 102 may be constructed using a set of side-by-side fuselage subassemblies 200a, 200b (e.g., side-by-side lobes), a set of longitudinal structural components 208, a plurality of spaced floor beams 204 arranged to support a cabin floor 214 within the wide-body fuselage 102, a plurality of cable bundles 206 to serve as vertical tension members between the set of longitudinal structural components 208, and an aircraft skin 202. In aspects of the present disclosure, the 3-dimensional woven composite preform provides a structural distribution member between the longitudinal structural components 208 and the aircraft skin 202 along the Y-joint between the two lobes of the fuselage.

The set of side-by-side fuselage subassemblies 200a, 200b (the set defining a wide-body fuselage assembly or section), are coupled to one another via, for example, an upper longitudinal structural component 208a and a lower longitudinal structural component 208b. The set of side-by-side fuselage subassemblies 200a, 200b may be generally cylindrical and fabricated from a plurality of stringers 212 and a plurality of frames 210. The airframe resulting from the plurality of frames 210 and the plurality of stringers 212 is covered by the aircraft skin 202 to provide an aerodynamic surface (e.g., smooth surface).

The wide-body fuselage 102 may be shaped such that the cross-section resembles two "bubbles" (or fuselage lobes) protruding from each side of the longitudinal structural component(s) 208. As illustrated, the shape of the wide-body fuselage 102 is generally defined by the wide-body fuselage section, where each fuselage subassembly 200a, 200b defines one of the two lobes/bubbles.

As illustrated, the longitudinal structural component(s) 208 may be arranged to run the length of the wide-body fuselage 102 (e.g., from the nose to tail). The outer mold line (OML) of the wide-body fuselage 102 is generally defined by the vertically joined side-by-side fuselage subassemblies 200a, 200b. Two longitudinal structural components 208 are positioned at the intersection of side-by-side fuselage subassemblies 200a, 200b, which form a lengthwise "Y-joint." That is, a lengthwise Y-joint may be positioned along the top (crown) and the bottom (belly) of the wide-body fuselage 102 to yield a substantially elliptic outer mold line widebody fuselage cross-section—a double-bubble cross-section. The two side-by-side fuselage subassemblies 200a, 200b can be joined at the center of the cross-section with either a cusped or parallel intersection.

The one or more longitudinal structural components 208 provide rigidity along the longitudinal length of the widebody fuselage 102 and support the plurality of frames 210. As illustrated, the plurality of frames 210 may be joined to one another along the upper and lower center line of the wide-body fuselage 102 (in the longitudinal direction) via the one or more longitudinal structural components 208 (e.g., upper and lower longitudinal structural components 208a, 208b). The longitudinal structural components 208 may be, or may be supports for, for example, keel beams or longerons. The one or more longitudinal structural components 208 may be fabricated from a metal alloy or a composite material. When assembled, the frames 210 define the side-by-side fuselage subassemblies 200a, 200b of the double-bubble shape of the wide-body fuselage 102. The plurality of stringers 212 are perpendicularly arranged (relative to the length of the frames 210) along the periphery of the double-bubble cross-section 200 defined by the frames 210 and configured run longitudinally the length of the wide-body fuselage 102. The plurality of stringers 212 supports the aircraft skin 202. The one or more longitudinal structural components 208 may be fabricated from a composite material, though a metal alloy is possible.

The aircraft skin 202 may be joined, at multiple fuselagestations, to one or more of: the stringers 212 running along the length of the wide-body fuselage 102; the floor beams 204 spanning the wide-body fuselage 102; the upper and/or lower longitudinal structural components 208a, 208b; and the frames 210. The fuselage-stations may be positioned, for example, at each frame 210, each stringer 212, or at each intersection of a frame 210 and a stringer 212.

The stiffness of the aircraft skin 202 may be adjusted to affect the static aeroelastic behavior and the elastic dynamic modes of the wide-body aircraft 100. In one aspect, the aircraft skin 202 may be fabricated as a one-piece composite skin component and joined to longitudinal beam(s) (e.g., the upper and lower longitudinal structural components 208a, 208b and/or stringers 212) through a fastened or co-cured braided composite Y-shaped support, such as the 3-dimensional woven composite preform. For example, to maximize producibility and performance, the aircraft skin 202 may be a composite material and co-cured with the 3-dimensional woven composite preform and other components of the wide-body fuselage 102. In certain aspects, the stringers 212 and the aircraft skin 202 may be formed as an integral component.

The shape of each frame 210 may be selected as a function of the desired shape of the fuselage subassembly's 200a, 200b OML at a given position along the length of the wide-body fuselage 102. In one aspect, as best illustrated in FIG. 2c, the frames 210 can be rib-shaped (e.g., a circular ring that is clipped on one side). The frames 210 may have an arc length of, for example, between about π radians and 3π/2 radians, more preferably between about 3.5 radian and 4.5 radian, or most preferably and as illustrated, about 4π/3 radians (i.e., about 240 degrees). The distal ends of each frame 210 are configured to mate with a corresponding (e.g., mirrored) frame 210 of the opposite fuselage lobe via the upper and lower longitudinal structural components 208a, 208b secured by one or more 3-dimensional woven composite preforms along the length of the frame.

For example, each of the side-by-side fuselage subassemblies 200a, 200b may be generally cylindrical, but clipped along its longitudinal length on at least one side to define a flat side. As will be appreciated, the flat sides of adjacent fuselage subassemblies 200a, 200b face one another when arranged side-by-side. Alternatively, a substantially rectangular fuselage section may be positioned between the flat sides of two clipped circular, or semi-circular, fuselage sections to define a generally oval fuselage.

Load flow through a wide-body fuselage 102 varies compared to a classic tubular fuselage. In addition, the cabin design pressure results in significantly higher bending stress in the region where the side-by-side cylinders are merged (i.e., at the Y-joint). As described herein, the 3-dimensional woven composite preform secures the various elements to one another, such as by co-curing and/or other securing means.

Due to a wide, relatively flat, OML contour of the top and bottom portions of the wide-body fuselage 102 (a departure from traditional circular/tube-like fuselages), design trades are required to mass-optimize the internal structure. For example, traditional 'tube-like' fuselages take advantage of reacting pressure loads as membrane forces; thereby avoiding flat sections that react pressure loads as bending moments. In the case of a wide-body fuselage, inflections can occur at the flat sections of the top and bottom regions of the wide-body fuselage, thereby warranting reinforcement at the flat sections.

A wide-body fuselage 102 may have a greater mass in comparison to an equivalent aircraft as weight (and complexity) can be attributed to the additional material needed at the Y-joint for reinforcement. Therefore, a pressurized wide-body fuselage 102, or another fuselage having a drastic change in circumference, may require strong, lightweight structural elements, such as 3-dimensional woven composite preform, to react internally to distribute forces at the Y-joint sections in the aircraft. In other words, the Y-shaped woven composite preform distributes the load transversely to avoid localization of forces at any given point along the intersection.

A number of solutions are available for reinforcing the upper (crown) and lower (belly) regions; however, many of the solutions are impractical due to space constraints and aesthetics in the passenger cabin. One solution is to position one or more vertical tension members, which serve as central vertical tension member, between the crown and belly cusps to prevent the crown and belly cusps of the wide-body fuselage 102 from flattening due to outward pressure loads from the pressurized cabin.

For example, a 3-dimensional woven composite preform in conjunction with a longitudinal structural component 208 (e.g., a stiff keel beam) can be used as an intermediary member between the aircraft skin 202 and vertical tension members to help distribute the concentrated loads from the vertical tension members into the aircraft skin 202. Another solution is to reinforce the crown and belly regions with larger frames and/or partial keels to react the bending moments in these relatively flat sections. This approach increases the strength capability, however at the expense of increased weight. For example, structural complexities can be introduced in the cusped regions of the crown and belly where the fuselage lobes are joined (e.g., bolted, bonded, etc.). Placement of a 3-dimensional woven composite preform (e.g., at the Y-joint) at the intersection serves as a distribution member for forces resulting from internal pressures acting on vertical tension members during flight.

As illustrated in FIG. 2a, each of plurality of cable bundles 206 is arranged vertically and distributed along the longitudinal length of the wide-body fuselage 102; between the upper and lower longitudinal structural components 208a, 208b. The cable bundles 206 serve as the primary structures to transfer loads between the top and bottom of the wide-body fuselage 102. The floor beams 204 define the horizontal cabin floor 214, which divides the cavity defined by the wide-body fuselage 102 along the lateral (horizontal) plane into the passenger cabin 216 and the baggage compartment 218. The floor beams 204 serve as a primary structure to transfer payload forces to the sides of the wide-body fuselage 102.

As illustrated, the cable bundle 206 may be attached between the upper and lower longitudinal structural components 208a, 208b of the wide-body fuselage 102 via a pair of cable couplings 220. The longitudinal structural components 208a, 208b may be, for example, keel beams or longerons running longitudinally through the wide-body fuselage 102. The longitudinal structural components (beams) 208 can be secured to the fuselage at the Y-joint by the 3-dimensional woven composite preform. As shown, the preform may extend the entire length of the fuselage and/or the longitudinal structural components (beams) 208. However, the woven composite preform may be any suitable length to accommodate manufacturing, aircraft design, structural considerations, etc. Thus, a single woven composite preform can be used at the joint between sections, or any number of preform supports may be employed as needed to ensure the strength and integrity of the aircraft.

Therefore, in one aspect, the wide-body fuselage 102 may comprise a set of side-by-side fuselage subassemblies 200a, 200b (defining a wide-body fuselage section of the center fuselage subassembly 102b, for example), a first and a second structural component 208a, 208b, and a plurality of tension members (e.g., cable bundles 206). Each of the first structural component 208a and the second structural component 208b can be arranged to traverse a longitudinal length of the wide-body fuselage section. The plurality of tension members may be arranged to manage tension between the first structural component 208a and the second structural component 208b. The plurality of tension members is configured to remain flexible under a compression load.

The D8 aircraft concept enables substantial efficiency improvements over conventional air vehicles. For instance, the efficiency gains of the D8 stem from increased lift generated by the wide "double-bubble" fuselage 102 (see, for example, FIG. 2b), resulting in smaller wings 110 to carry the vehicle's weight, which requires less fuel for a given aerial mission. In some examples, propulsors 118 are integrated into the integral nacelle cowling diffusers 116 at back of the wide-body fuselage 102, such that thrust requirements are further reduced due to efficiencies from Boundary Layer Ingestion (BLI). Thus, smaller propulsors 118 can be used, which further reduces weight and fuel.

In a dual-lobe, wide-body fuselage, such as the D8, a woven composite preform 414 is configured to provide a load path between the crown and belly (cusped regions) of the fuselage skin 202, a need that is unique to such a fuselage design. By this disclosure, the woven fiber of the preform 414 can be tailored to meet complex load paths experienced by such an aircraft. For instance, at the Y-joint between the two lobes, stresses due to weight can be mitigated in an efficient manner, with low manufacturing complexity in comparison to conventional methods, with reductions in time and labor, and therefore cost.

An aircraft with an elliptical wide-body fuselage (e.g., the D8 aircraft), with a pressurized cabin would require large structural frames and longerons to resist bending of the upper and lower panels at the Y-joint. However, the use of a large, heavy structural frames and corresponding longerons would be weight prohibitive for such an aircraft.

By contrast, a constant radius, dual-lobe wide-body fuselage with a pressurized cabin could maintain conventional frame and longeron sizing near the top and bottom. This is possible, as the constant radius frame does not have flat skin panels under dynamic pressure loading. In the dual-lobe wide body aircraft, the interface between the two lobes requires a strong joint to transfer complex loads. A metallic fitting, or a joint made from built up parts, could be complex, costly, and weight prohibitive In the present disclosure, a preform comprising woven fiber can be tailored to meet the complex load paths at such a joint. As noted, the composite preform provides the needed stability in a weight efficient manner, with relatively low manufacturing complexity, time, labor, and cost in comparison to conventional systems and methods.

Conventional pi-preforms have been used in such a way as to maintain the "Pi" shape in the joint. In other words, the legs of the preform maintained perpendicularity in the final application. Due to the nature of this perpendicularity, strength of the joint was limited by the loads normal to the face or cap of the pi-preform, which may cause a resin or bondline failure.

The preform concept disclosed herein has flanges that are angled, creating a "Y" shape in the joint. This allows more of the load to translate from a normal force to a planer force, which increases the strength of the joint by reducing dependency on the resin, or bondline, and relies on the strength of the fibers. Therefore, the occurrence of a structural failure at the resin or bondline is mitigated by the design of the woven, composite preform disclosed herein.

FIG. 3a illustrates an enlarged view of the wide-body fuselage 102 at its Y-Joint as shown in item 400 (Detail B). As illustrated, the side-by-side fuselage subassemblies 200a, 200b define a cross-section with a longitudinal structural component 208 (located at the lobe joints 226, thus formation of a "Y-joint") using either a cusped or parallel intersection. The Y-joint may be defined by a longitudinal structural component 208, a 3-dimensional woven composite preform 414 (e.g., a preform, such as a Y-shaped member), and aircraft skin 202. The 3-dimensional woven composite preform 414 transfers a portion of the pressure load between the aircraft skin 202 and the cable bundle 206. Where an oval OML is desired, for example, a panel 224 of aircraft skin 202, aka a fairing, may be bridged across the Y-Joint between the side-by-side fuselage subassemblies 200a, 200b to provide a parallel intersection. In certain aspects, the structural Y-joint of the wide-body fuselage 102 may be composed of the co-cured aircraft skin 202 and 3-dimensional woven composite preform 414 and the longitudinal structural component 208, where the 3-dimensional woven composite preform 414 may be co-cured or co-bonded with the longitudinal structural component 208 (or a keel) and, in some cases, the cable bundle 206; though a mechanical coupling is contemplated and described in connection with the Figures. In examples, the 3-dimensional woven composite preform 414 becomes rigid once cured, maintaining the shape desired at the co-curing stage.

Accordingly, an example preform for structural joint splicing having a 3-dimensional woven pattern is disclosed. In the example of FIG. 3b, the 3-dimensional woven composite preform 414 is shown in detail 416 from FIG. 3a. As shown, the 3-dimensional woven composite preform 414 is a structural distribution member at the interface between the longitudinal structural components 208.

Figure 4B:
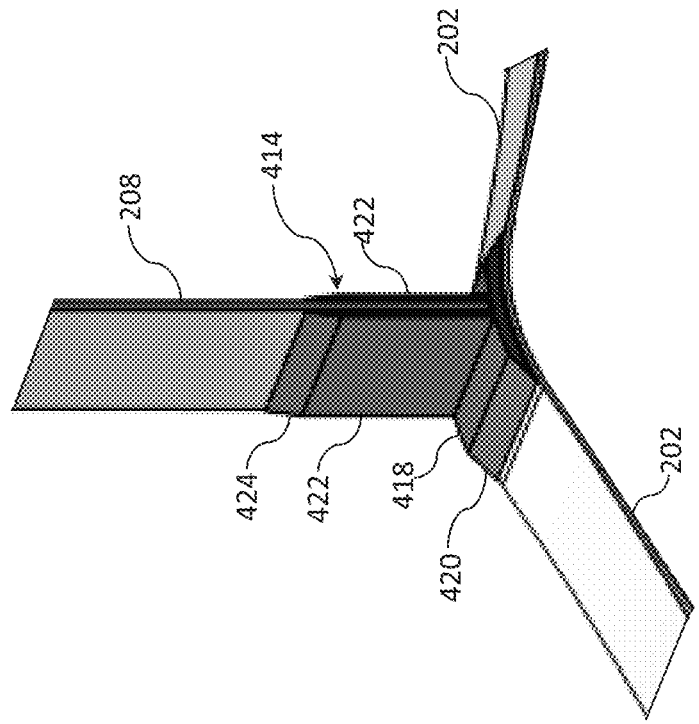
FIGS. 4b and 4c show example 3-dimensional woven composite preform products.
Figure 4A:
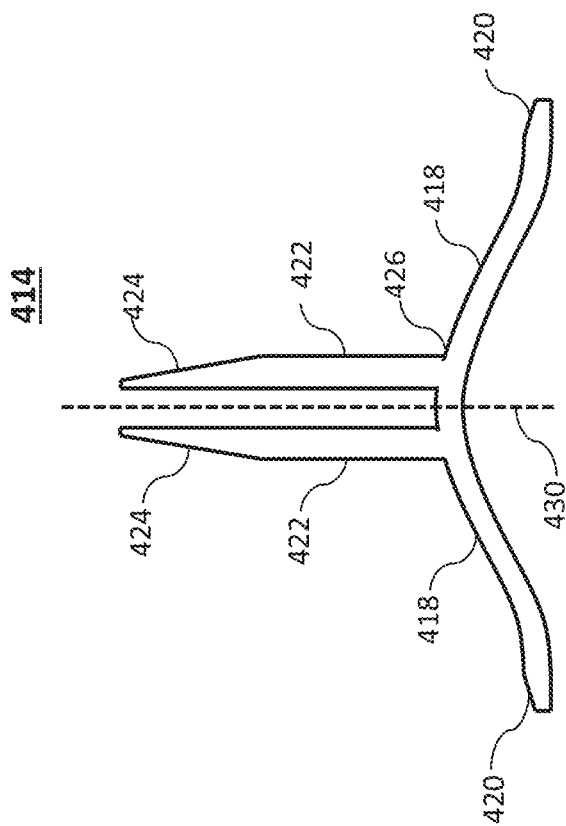
FIG. 4a illustrates an example 3-dimensional woven composite preform.
Figure 4C:
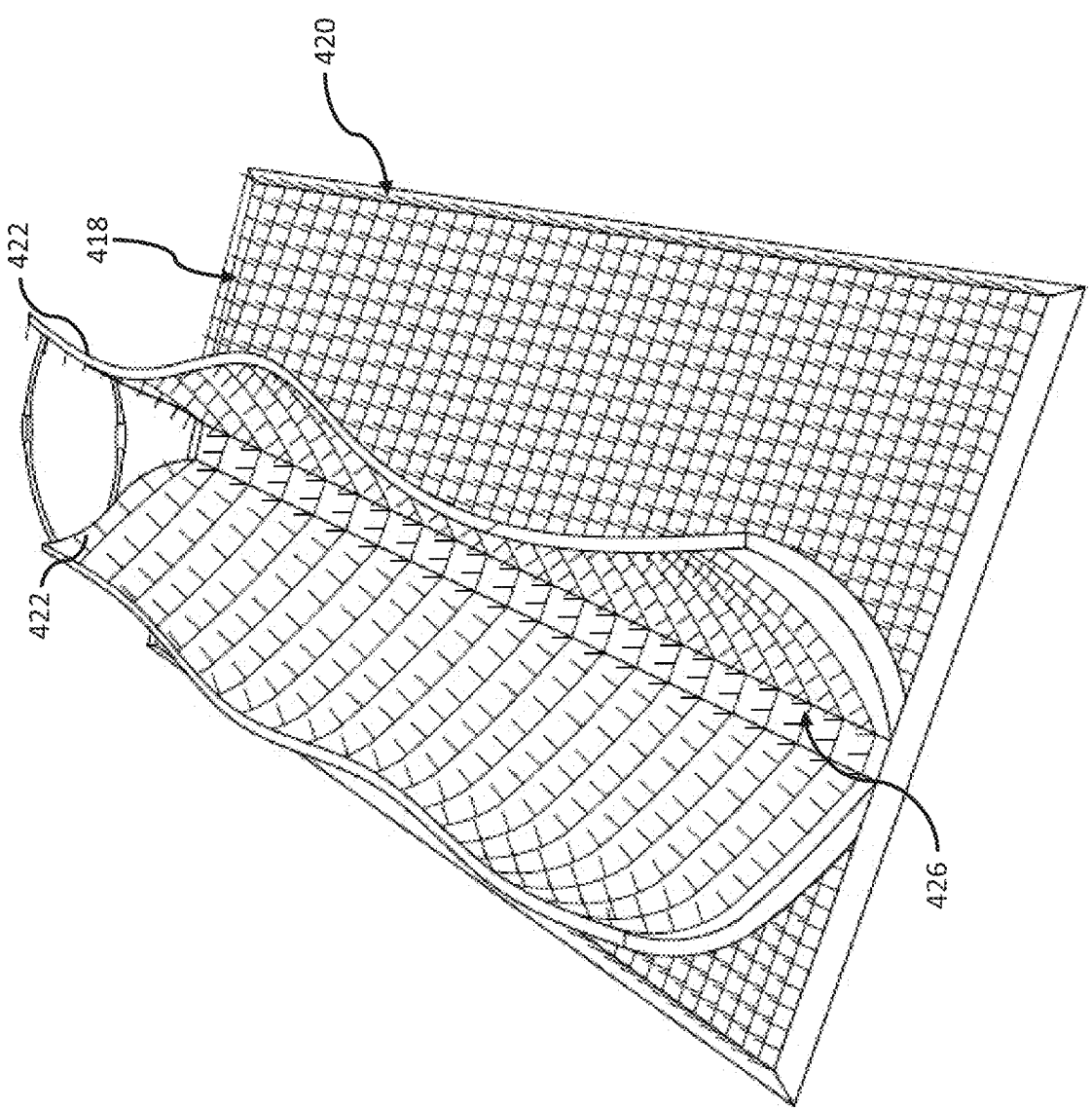

FIGS. 4a-4c illustrate additional and/or alternative examples of the 3-dimensional woven composite preform 414. For example, the preform structure 414 can be woven to provide interlocking layers of fiber suitable to balance loads in a dual-lobe, wide body fuselage (e.g., the D8 aircraft). The preform 414 has a non-planar base 418 and two or more legs 422 extending from the base, for example.

The legs 422 can be secured to the base 418 at a central point 426 (e.g., equidistant from centerline 430), such that an equal length of base 418 extends from each side of the leg 422. The preform 414 may, however, have a non-symmetrical structure, with unequal base 418 lengths on either side of the legs 422. Moreover, the two or more legs 422 may be of equal or unequal lengths, as measured from the surface of the base 418. Although shown as generally extending at an angle normal to an average surface arc of the central point 426 from which the legs 422 extend, the legs 422 may be angled with respect to the base 418 (e.g., non-parallel to centerline 430). The legs 422 can be spaced apart to create a gap, which can be dimensioned to accept a support member (e.g., structural component 208).

Additionally or alternatively, the endpoints 420, 424 of the base and/or the legs, respectively, may have a tapered angled shape. In other examples, the endpoints 420, 424 are not tapered, and/or terminate in a particular geometry or style, depending on the particular purpose and/or structure to which the preform 414 is to be attached.

FIG. 4b illustrates an example 3-dimensional woven composite preform 414 with a longitudinal structural component 208 inserted between legs 422. The base 418 is in contact with and formed to follow the contours of aircraft skin 202. The 3-dimensional woven composite preform 414 can be co-cured with the aircraft skin 202, for example. Additionally or alternatively, the 3-dimensional woven composite preform 414 can be fastened (e.g., by adhesive, bolts, etc.) to the longitudinal structural component 208. Moreover, a 3-dimensional woven composite preform 414 and the longitudinal structural component 208 can be joined at a top and a bottom cusp where the subassemblies 200a, 200b (i.e. lobes) intersect. Thus, vertical tension members 206 can be fastened to each structural component 208, enabling the 3-dimensional woven composite preform 414 to distribute forces from the vertical tension members 206 experienced during flight.

As shown in FIG. 4c, the 3-dimensional woven composite preform 414 is constructed from a series of woven fibers to generate a shape consistent with the preform 414 described herein. In an example, the fiber and/or stranded cable may be fabricated from a low, intermediate, or a high modulus carbon fiber. However, any other material that can achieve the required shape and weave may also be used depending on the application. Additionally or alternatively, the joint can be co-cured, bonded together, fastened together, or assembled by any other means that can transfer loads between the keel (e.g., structural component 208) and skin 202 of the dual-lobe fuselage 102.

In some examples, the preform 414 is woven using a single material such as carbon (e.g., graphite). In other examples, the preform 414 may be a hybrid woven patterns that uses multiple materials, such as carbon and glass. Considered weave patterns include outer fibers of a first type and fill fibers of a second type. In some examples, the weave may have alternating fiber types, such as in a "checkerboard" pattern of layers.

This woven fiber preform 414, as shown generally in the shape of a "Y", is thus used as a structural distribution member to react to cabin pressure loads in a dual-lobe wide-body aircraft fuselage, at the interface of the two lobes. The Y-shaped preform can be made by weaving fibers to desired dimensions and impregnating the woven composite preform with a resin system.

The woven carbon fiber preform is shaped and tailored for a structural load path that is unique to a dual-lobe fuselage. When the woven carbon fiber preform is made from fiber and resin systems, the resin being impregnated into the preform 414 during the joining process between aircraft lobes, the woven shape of "Y" with two substantially vertical legs and an arced cap, is configured to transfer the stresses from cabin pressure load at the skin interface between the two lobes of a dual-lobe, wide-body, fuselage and their respective keel beams.

As illustrated in FIG. 4c, the preform 414 may be fabricated using a plurality of strands (e.g., yarns, plies, fibers) that are arranged into a larger and stronger form. For example, strands can be resin infused or dry; alternatively, the plurality of strands can be twisted or braided together, etc. Depending on fabric properties, where one direction of fiber is straight and the other direction weaves over and under, there is a reduced stiffness in the direction of fibers that weave over and under. In certain aspects, the preform 414 may be fabricated using two or more strand bundles, where each strand bundle comprises a plurality of strands. For example, a plurality of strands may be bundled together to define a strand bundle. A plurality of strand bundles may then be bundled together to define the preform 414.

The strands may be fabricated from one or more materials including, inter alia, carbon fiber (e.g., low, intermediate, or high modulus carbon fiber), aluminum, steel, nylon, polyester, polypropylene, high modulus polyethylene (HMPE), and aramid. In one example, the strands may be fabricated using carbon fiber strands and/or carbon fiber tow. An advantage of using a composite material to fabricate the cable bundle is that the preform 414 may also be lighter than alternative materials. Moreover, the structure of the preform 414 is designed to become rigid once cured, and maintain the shape the preform 414 holds at the time of curing.

Referring back to FIG. 3a, as illustrated, a plurality of lug fittings 404 may be distributed along the longitudinal length of the longitudinal structural component 208. The plurality of lug fittings 404 may be evenly distributed along the length of the longitudinal structural component 208, or localized to address areas where additional load distribution is needed. For example, a lug fitting 404 may be positioned between each set of frames 210, or between every $n^{th}$ set of frames 210, where n is a number between 2 to 10. For example, a lug fitting 404 can be positioned between each set of frames 210 (i.e., n=1), while FIG. 3a illustrates an example where a lug fitting 404 is positioned between every other set of frames 210 (i.e., n=2). In the various illustrated examples, the ratio of frames 210 to floor beams 204 is 1:1, however other ratios are possible depending on, for example, weight requirements for the cabin floor 214.

The lug fitting 404 may be secured to the longitudinal structural component 208 via a gusseted fitting 402, which reduces localized stress on the longitudinal structural component 208. As illustrated, the longitudinal structural component 208 is positioned between the lug fitting 404 and the gusseted fitting 402. The lug fitting 404 and gusseted fitting 402 may be bolted to one another (and the longitudinal structural component 208). Alternatively, depending on the materials, the lug fitting 404 and gusseted fitting 402 may be adhered to, or co-cured/co-bonded, with the longitudinal structural component 208. As will be described, the cable bundle 206 can couple to the lug fitting 404 via one or more cable coupling arrangements. In other words, the lug fitting 404 serves as an attachment point for the cable bundle 206.

As illustrated, the longitudinal structural component 208 may be an I-beam. An I-beam provides a cross section having two spaced, parallel elements (known as flanges) coupled to one another via a perpendicular element (known as a "web"). The parallel elements provide a top surface and a bottom surface, while the perpendicular element provides two side surfaces. As illustrated, in the case of the lower longitudinal structural component 208b, the lug fitting 404 may be positioned on the top surface of the I-beam. While not illustrated in detail, the lug fitting 404 may be positioned on the bottom surface of the I-beam in the case of the upper longitudinal structural component 208a. A gusseted fitting 402 may be positioned on each side of the I-beam's perpendicular element and configured to bolt with each other and with the lug fitting 404 through one of the two spaced, parallel elements (either the top surface or the bottom surface, as the case may be).

Figure 5B:
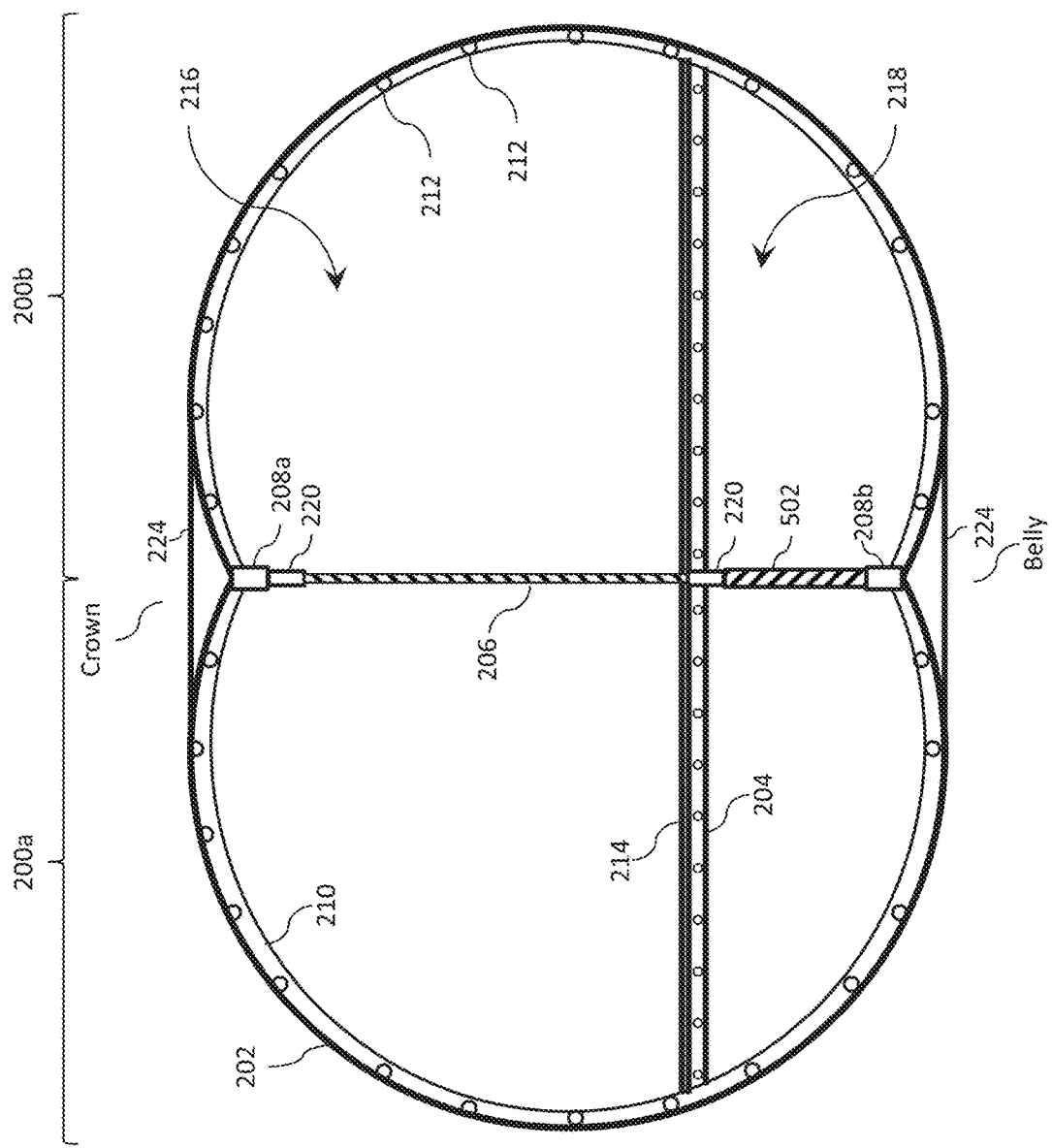
FIG. 5b illustrates a cross-sectional view of a wide-body fuselage taken along cross-section B-B of FIG. 1c having a hybrid of a cable bundle and a keel.

While the cable bundle 206 is described as connecting the upper and lower longitudinal structural components 208, other configurations are contemplated. In certain aspects, a hybrid connection may be implemented. For example, a hybrid may be used that comprises a cable bundle 206 and a keel 502 (e.g., a wall, such as a partial-height shear web). For example, as illustrated in FIGS. 5a and 5b, a cable bundle 206 may be used in conjunction with a keel 502. As incorporation of a structure down the middle of a passenger cabin 216 is an unconventional approach, a keel 502 may be used only as the baggage compartment 218. The keel 502 may be used as a floor center support, thereby reducing the size requirements and weight of the floor beams 204.

The keel 502 may couple to (or be integral with) the lower longitudinal structural component 208b and extend upward from the lower Y-joint via a woven composite preform structural support (e.g., preform 414) to the horizontal cabin floor 214, at which point the keel 502 terminates and is substituted by a plurality of cable bundles 206 (e.g., via a first cable coupling 220). The keel 502 may be co-cured or co-bonded with the longitudinal structural component 208 (e.g., via preform 414). As illustrated, the cable bundle 206 may couple at a first end to the keel 502 and at a second end to the upper longitudinal structural component 208a (e.g., via a second cable coupling 220). In operation, loads are passed between the upper and lower longitudinal structural components 208a, 208b via the cable bundle 206 and the keel 502. To reduce weight and provide an access pathway between the left and right sides of the baggage compartment 218, the keel 502 may include cutouts 504. As illustrated, the cutouts 504 may be circular or oval.

Figure 6:
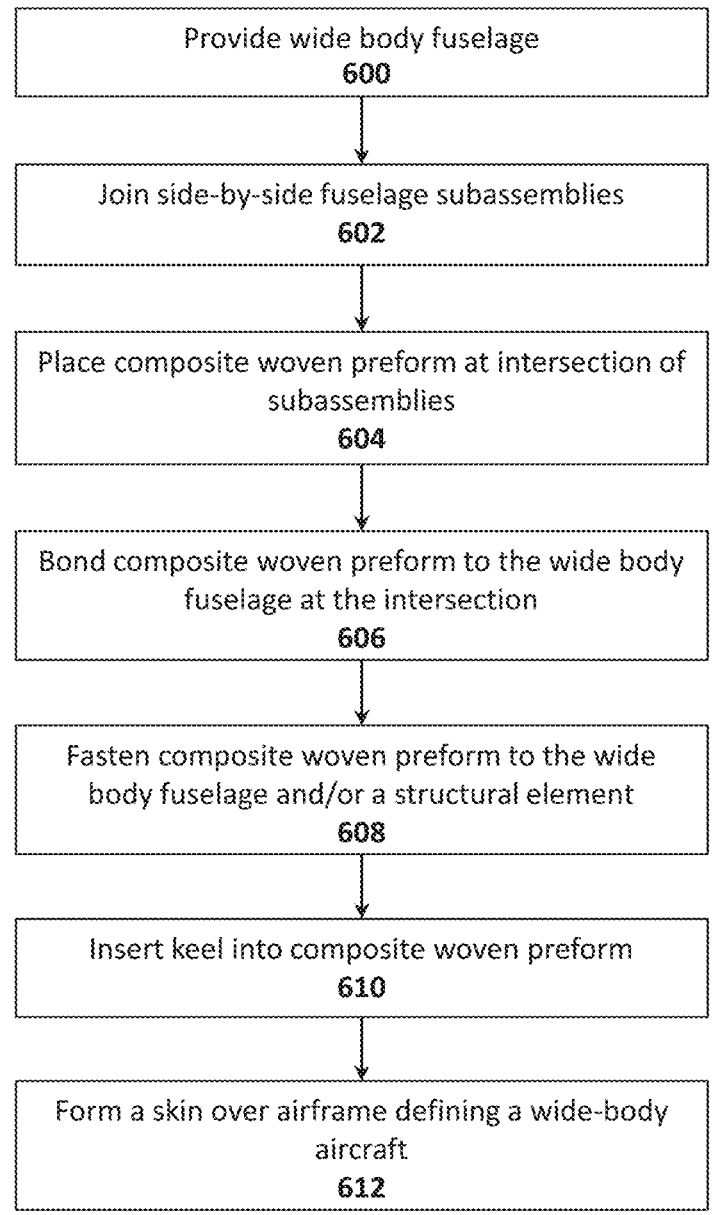
FIG. 6 provides an example method of managing tension in a wide-body fuselage employing a 3-dimensional woven composite preform.

FIG. 6 provides an example method of managing tension in a wide-body fuselage employing a Y-shaped woven composite preform as described herein. In block 600, the method includes providing a wide-body fuselage comprising a set of side-by-side fuselage subassemblies. In block 602, the set of side-by-side fuselage subassemblies are joined together, forming an intersection at the top and bottom of the resulting wide-body fuselage. At block 604, a Y-shaped woven composite preform is placed at the intersection. At block 606, the Y-shaped woven composite preform is bonded to the wide-body fuselage at the intersection (e.g., via a resin or other adhesive). In an example, the Y-shaped woven composite preform could be co-cured to the intersecting joint and/or the keel, but it is additionally or alternatively possible to bond (e.g., by adhesive) the intersecting joint and the keel to the Y-shaped woven composite preform. Once bonded (or otherwise cured, fastened) the Y-shaped woven composite preform is configured to become rigid. In some examples, shown at block 608, a wall of the wide-body fuselage 102 and/or the structural component 208 is fastened to the Y-shaped woven composite preform legs 422.

At block 610, a keel is inserted or otherwise placed within the Y-shaped woven composite preform. A keel is provided at the top and bottom intersections of the wide-body fuselage, and each is configured to secure between the two keels a plurality of vertical tension members. As such, the Y-shaped woven composite preform is configured to distribute forces from pressure built up within the airframe during flight. For example, the woven composite structure is configured to distribute forces from the vertical tension members to allow distribution of the load transversely along the intersection between the lobes. At block 612, a skin is formed over the airframe defining the wide-body aircraft. Although represented as being formed after placement of the keel, the skin can be formed at any time following the joining of the side-by-side fuselage subassemblies.

Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. A fuselage comprising:
a wide-body fuselage section comprising a set of side-by-side fuselage lobes having a fuselage skin;
a first woven composite preform positioned at a first intersection of the set of side-by-side fuselage lobes and located at a first cusp of the set of side-by-side fuselage lobes; and
a second woven composite preform positioned at a second intersection of the set of side-by-side fuselage lobes and located at a second cusp of the set of side-by-side fuselage lobes,
wherein each of the first and second woven composite preforms are configured to receive a structural component, such that each of the first and second woven composite preforms accommodates a vertical load imparted through the structural component,
wherein the first and second woven composite preforms are co-cured with the fuselage skin of the set of side-by-side fuselage lobes to maintain a desired shape, and
wherein the first and second woven composite preforms are substantially Y-shaped.

2. The fuselage of claim 1, wherein the set of side-by-side fuselage lobes are arranged to define a non-circular cross-section along a lateral length of the wide-body fuselage section.

3. The fuselage of claim 1, further comprising a vertical tension member secured between the structural component received by each of the first and second woven composite preforms, the first and second woven composite preforms configured to distribute tensile or compressive loads from the vertical tension member.

4. The fuselage of claim 1, wherein the first and second woven composite preforms become rigid once co-cured.

5. The fuselage of claim 1, wherein each of the first and second woven composite preforms is configured to transfers at least a portion of a pressure load between the fuselage skin and one or both of the first and second woven composite preforms.

6. The fuselage of claim 1, wherein the structural component is a tension member configured to manage tension between the first intersection and the second intersection.

7. The fuselage of claim 1, wherein the wide-body fuselage section comprises a plurality of floor beams arranged to support a cabin floor within the wide-body fuselage section between the first intersection and the second intersection; and a plurality of tension members arranged to pass through the cabin floor and to manage tension between the first intersection and the second intersection, wherein each of the plurality of tension members is configured to pass between two adjacent floor beams of said plurality of floor beams and to remain flexible under a compression load.

8. The fuselage of claim 1, wherein the first and second woven composite preforms comprise one or more legs extending from a non-planar base to define the substantially Y-shape.

9. The fuselage of claim 8, wherein each of the first and second woven composite preforms are impregnated with a resin to be co-cured with the set of side-by-side fuselage lobes at a joint.

10. The fuselage of claim 8 wherein base is configured to conform to an arced contour of the wide-body fuselage section and the legs are configured to secure structural component.

11. The fuselage of claim 10, wherein each of the one or more legs is tapered.

12. The fuselage of claim 1, wherein each of the first and second woven composite preforms comprises a plurality of strands that are woven together to form a structural distribution member for the set of side-by-side fuselage lobes and the structural component.

13. The fuselage of claim 12, wherein the plurality of strands comprises at least one of carbon fiber, steel, or aluminum.

14. The fuselage of claim 12, wherein the plurality of strands is arranged to define a plurality of strand bundles.

15. The fuselage of claim 14, wherein the plurality of strands is twisted or braided to define the plurality of strand bundles.

* * * * *